US010380222B2

(12) United States Patent
Duesterwald et al.

(10) Patent No.: US 10,380,222 B2
(45) Date of Patent: Aug. 13, 2019

(54) MATRIX FACTORIZATION WITH TWO-STAGE DATA BLOCK DISPATCH ASSOCIATED WITH GRAPHICS PROCESSING UNITS

(71) Applicant: International Business Machines Corporation, Armonk, NY (US)

(72) Inventors: Evelyn Duesterwald, Millwood, NY (US); Liana Liyow Fong, Irvington, NY (US); Wei Tan, Elmsford, NY (US); Xiaolong Xie, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 15/294,850

(22) Filed: Oct. 17, 2016

(65) Prior Publication Data
US 2018/0108105 A1 Apr. 19, 2018

(51) Int. Cl.
 G06F 17/16 (2006.01)
 G06T 1/20 (2006.01)
 (Continued)

(52) U.S. Cl.
 CPC .............. G06F 17/16 (2013.01); G06F 9/46 (2013.01); G06F 9/5083 (2013.01); G06N 3/08 (2013.01);
 (Continued)

(58) Field of Classification Search
 None
 See application file for complete search history.

(56) References Cited

U.S. PATENT DOCUMENTS 7,561,975 B2 * 7/2009 Young ................ G01N 30/8675
 702/22
8,373,710 B1 * 2/2013 Vij ........................ G06F 9/5044
 345/502

(Continued)

OTHER PUBLICATIONS

Yun, et al., "NOMAD: Nonlocking, stOchastic Multimachine algorithm for Asynchronous and Decentralized matrix completion," Proceedings of the VLDB Endowment 7.11 (2014), pp. 975-986, Sep. 2014.

(Continued)

*Primary Examiner* — Joni Richer
(74) *Attorney, Agent, or Firm* — Amin, Turocy & Watson, LLP

(57) ABSTRACT

Techniques that facilitate matrix factorization associated with graphics processing units are provided. In one example, a system includes a first graphics processing unit, a second graphics processing unit and a central processing unit. The first graphics processing unit processes a first data block of a data matrix associated with a matrix factorization system to generate first information for the matrix factorization system. The second graphics processing unit processes a first portion of a second data block of the data matrix separate from a second portion of the second data block to generate second information for the matrix factorization system. The central processing unit processes a machine learning model for the matrix factorization system based on at least the first information provided by the first graphics processing unit and the second information provided by the second graphics processing unit.

20 Claims, 19 Drawing Sheets

(51) Int. Cl.
    *G06N 3/08* (2006.01)
    *G06F 9/50* (2006.01)
    *G06F 9/46* (2006.01)
    *G06N 20/00* (2019.01)
(52) U.S. Cl.
    CPC .............. *G06N 20/00* (2019.01); *G06T 1/20* (2013.01); *G06T 2200/28* (2013.01)

(56) References Cited

U.S. PATENT DOCUMENTS

| | | | | |
|---|---|---|---|---|
| 9,477,925 | B2* | 10/2016 | Seide | G06N 3/08 |
| 2005/0125369 | A1* | 6/2005 | Buck | G06K 9/00986 |
| | | | | 706/12 |
| 2015/0269122 | A1* | 9/2015 | Lang | G06Q 30/0269 |
| | | | | 708/607 |
| 2016/0239706 | A1* | 8/2016 | Dijkman | G06F 17/3028 |
| 2016/0321776 | A1* | 11/2016 | Zou | G06T 1/20 |
| 2017/0193368 | A1* | 7/2017 | Le Grand | G06N 3/088 |

OTHER PUBLICATIONS

Zhuang, et al., "A Fast Parallel SGD for Matrix Factorization in Shared Memory Systems," RecSys 2013, pp. 249-256, Oct. 2013.

Tan, et al., "Faster and Cheaper: Parallelizing Large-Scale Matrix Factorization on GPUs," Proceedings of the 25th ACM International Symposium on High-Performance Parallel and Distributed Computing . ACM, 2016, 12 pages, Mar. 2016.

Li, et al. "A Fast Distributed Stochastic Gradient Descent Algorithm for MatrixFactorization," ICML BigMine Workshop . 2014, 11 pages, Aug. 2014.

Oh, et al., "Fast and Robust Parallel SGD Matrix Factorization," In Proceedings of the 21th ACM SIGKDD International Conference on Knowledge Discovery and Data Mining (KDD '15). ACM, New York, NY, USA, pp. 865-874. DOI: http://dx.doi.org/10.1145/2783258.2783322, Aug. 2015.

Jin, et al., "GPUSGD: A GPU accelerated stochastic gradient descent—algorithm for matrix factorization." Concurrency and Computation: Practice and Experience (2015), 22 pages, Dec. 2015.

Chin, et al., "A learning-rate schedule for stochastic gradient methods to matrix factorization." Pacific-Asia Conference on Knowledge Discovery and Data Mining . Springer International Publishing, 2015, 13 pages, Apr. 2015.

ibm.com, "IBM Packages for Apache Spark," https://www.ibm.com/developerworks/java/jdk/spark. Last Accessed: Oct. 6, 2016, 4 pages.

* cited by examiner

FIG. 7

MATRIX FACTORIZATION WITH TWO-STAGE DATA BLOCK DISPATCH ASSOCIATED WITH GRAPHICS PROCESSING UNITS

BACKGROUND

The subject disclosure relates to matrix factorization systems, and more specifically, to performing a matrix factorization process.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate matrix factorization associated with graphics processing units are described.

According to an embodiment, a system can comprise a first graphics processing unit, a second graphics processing unit, and a central processing unit. The first graphics processing unit can process a first data block of a data matrix associated with a matrix factorization system to generate first information for the matrix factorization system. The second graphics processing unit can process a first portion of a second data block of the data matrix separate from a second portion of the second data block to generate second information for the matrix factorization system. The second data block can comprise disjoint features as compared to the first data block. Also, the first data block and the second data block can comprise a corresponding size. The central processing unit can process a machine learning model for the matrix factorization system based on at least the first information provided by the first graphics processing unit and the second information provided by the second graphics processing unit.

According to another embodiment, a computer-implemented method is provided. The computer-implemented method can comprise processing, by a first graphics processing unit, a first data block from a set of data blocks based on a first policy to generate first information for a matrix factorization system. The computer-implemented method can also comprise dividing, by a second graphics processing unit, a second data block from the set of data blocks into a set of sub-blocks. The second data block can comprise disjoint features as compared to the first data block. Furthermore, the computer-implemented method can comprise processing, by the second graphics processing unit, the set of sub-blocks based on a second policy to generate second information for the matrix factorization system. The computer-implemented method can also comprise generating, by the central processing unit, a machine learning model for the matrix factorization system based on at least the first information provided by the first graphics processing unit and the second information provided by the second graphics processing unit.

According to yet another embodiment, a computer program product for matrix factorization can comprise a computer readable storage medium having program instructions embodied therewith. The program instructions can be executable by a central processing unit and cause the central processing unit to divide a data matrix associated with a matrix factorization system into a set of data blocks. The program instructions can also cause the central processing unit to assign a first data block from the set of data blocks to a first graphics processing unit. Furthermore, the program instructions can also cause the central processing unit to assign a second data block from the set of data blocks to a second graphics processing unit. The second data block can comprise disjoint features as compared to the first data block. The program instructions can also cause the central processing unit to generate a machine learning model for the matrix factorization system based on at least first information associated with the first data block that is determined by the first graphics processing unit, and the second information associated with the second data block that is determined by the second graphics processing unit.

DESCRIPTION OF THE DRAWINGS

FIG. 7 illustrates an example, non-limiting data matrix in accordance with one or more embodiments described herein.

DETAILED DESCRIPTION

Figure 1:
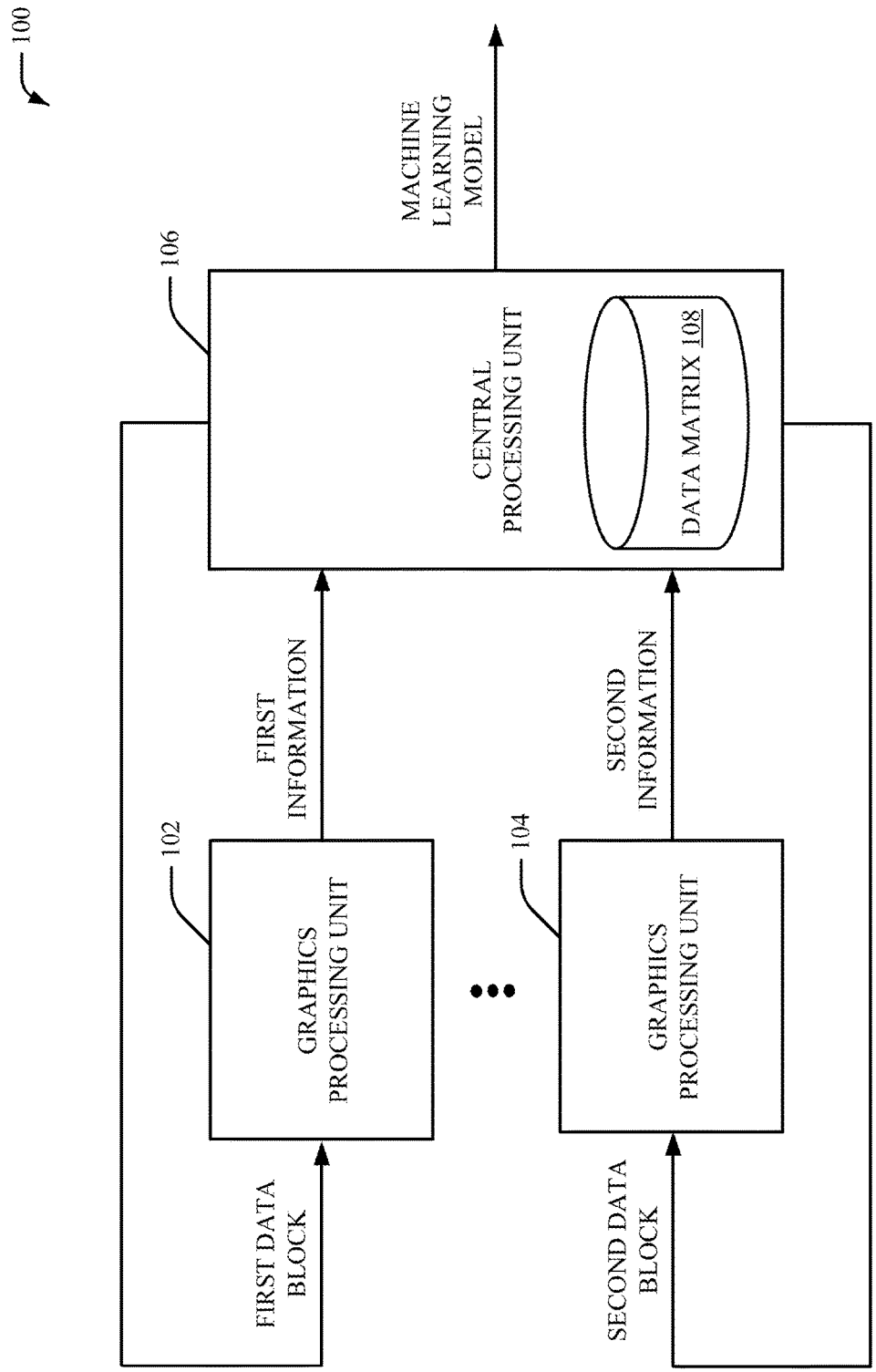
FIG. 1 illustrates a block diagram of an example, non-limiting system to facilitate matrix factorization associated with graphics processing units in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Matrix factorization can be employed by numerous technologies for processing data and/or providing collaborative filtering. For example, machine learning technologies, signal processing technologies, image processing technologies, data analysis technologies and/or other technologies can employ matrix factorization to analyze digital data, process digital data, determine inferences from digital data and/or determine relationships among digital data formatted as a matrix of digital data. However, computing performance for performing a matrix factorization process is generally limited by capabilities of a central processing unit that performs the matrix factorization process. Furthermore, a matrix factorization process is generally processed by a central processing unit with a limited degree of parallelism. As such, a central processing unit that performs a matrix factorization process can be associated with reduced processing performance, increased computing bottlenecks and/or reduced processing efficiency.

Embodiments described herein include systems, computer-implemented methods, and computer program products that facilitate matrix factorization associated with graphics processing units. For example, a matrix factorization process associated with stochastic gradient descent can be performed by two or more graphic processing units in communication with a central processing unit. Matrix factorization can refer to a technique for analyzing and/or processing digital data formatted as a matrix of digital data for technologies such as, but not limited to, machine learning technologies, collaborative filtering technologies, recommendation system technologies, signal processing technologies, word embedding technologies, topic model technologies, image processing technologies, data analysis technologies and/or other digital technologies. Stochastic gradient descent can refer to a stochastic approximation and/or determination of values associated with the digital data.

In an embodiment, a two-stage dispatch of data blocks from a data matrix can be performed with respect to multiple graphics processing units. For instance, during a first processing stage (e.g., a global processing stage) associated with inter-graphics processing unit (GPU) dispatch, a central processing unit can divide a data matrix of digital data into a set of data blocks. During the first processing stage, the central processing unit can assign and/or transmit a first data block from the set of data blocks to a first graphics processing unit. The central processing unit can also assign and/or transmit a second data block from the set of data blocks to a second graphics processing unit. During a second processing stage (e.g., a local processing stage) associated with intra-GPU dispatch, the first graphics processing unit can analyze and/or process the first data block. Furthermore, the second graphics processing unit can analyze and/or process the second data block without communicating with the first graphics processing unit. It is to be appreciated that the two-stage dispatch of data blocks from a data matrix can be performed with respect to more than two graphics processing units and/or more than one central processing unit in certain implementations.

In another embodiment, the first graphics processing unit can analyze and/or process the first data block based on a first processing policy. The first processing policy can comprise dividing the first data block into a set of sub-blocks via the first graphics processing unit to facilitate analysis and/or processing of the first data block. Alternatively, the first processing policy can comprise randomly selecting data elements of the first data block to be analyzed and/or processed by different processing threads of the first graphics processing unit. The different processing threads of the first graphics processing unit can analyze and/or process the data elements of the first data block with or without one or more communications between the different processing threads. Similarly, the second graphics processing unit can analyze and/or process the second data block based on a second processing policy. The second processing policy can include dividing the second data block into a set of sub-blocks via the second graphics processing unit to facilitate analysis and/or processing of the second data block. Alternatively, the second processing policy can include randomly selecting data elements of the second data block to be analyzed and/or processed by different processing threads of the second graphics processing unit. The different processing threads of the second graphics processing unit can analyze and/or process the data elements of the second data block with or without one or more communications between the different processing threads.

In yet another embodiment, the central processing unit can process and/or generate a machine learning model based on information associated with the first data block analyzed and/or processed by the first graphics processing unit. Additionally, the central processing unit can generate the machine learning model based on other information associated with the second data block analyzed and/or processed by the second graphics processing unit. Therefore, the central processing unit can generate and/or process a machine learning model using resultant information provided by at least the first graphics processing unit and the second graphics processing unit. Accordingly, processing performance of the central processing unit can be improved, computing bottlenecks of the central processing unit can be reduced and/or processing efficiency of the central processing unit can be improved. Moreover, an amount of time to perform a matrix factorization process can be reduced.

FIG. 1 illustrates a block diagram of an example, non-limiting system 100 that facilitates matrix factorization associated with graphics processing units in accordance with one or more embodiments described herein. In various embodiments, the system 100 can be a matrix factorization system associated with technologies such as, but not limited to, machine learning technologies, collaborative filtering technologies, recommendation system technologies, signal processing technologies, word embedding technologies, topic model technologies, image processing technologies, data analysis technologies and/or other digital technologies.

The system 100 can employ hardware and/or software to solve problems that are highly technical in nature, that are not abstract and that cannot be performed as a set of mental acts by a human. Further, some of the processes performed may be performed by one or more specialized computers (e.g., one or more graphics processing units) for carrying out defined tasks related to matrix factorization. The system 100 and/or components of the system can be employed to solve new problems that arise through advancements in technologies mentioned above, employment of matrix factorization processes, and/or computer architecture, and the like. One or more embodiments of the system 100 can provide technical improvements to matrix factorization systems, machine learning systems, artificial intelligence systems, collaborative filtering systems, recommendation systems, signal processing systems, word embedding systems, topic model systems, image processing systems, data analysis systems and/or other digital systems. One or more embodiments of the system 100 can also provide technical improvements to a central processing unit associated with a matrix factorization process by improving processing performance of the central processing unit, reducing computing bottlenecks of the central processing unit, improving processing efficiency of the central processing unit, and/or reducing an amount of time for the central processing unit to perform the matrix factorization process.

In the embodiment shown in FIG. 1, the system 100 can include a first graphics processing unit 102, a second graphics processing unit 104 and a central processing unit 106. The first graphics processing unit 102 and the second graphics processing unit 104 can be communicatively coupled to the central processing unit 106. The central processing unit 106 can include a data matrix 108 associated with a matrix factorization system. The data matrix 108 can include digital data formatted as a matrix of digital data. The digital data of the data matrix 108 can be generated by and/or provided by a machine learning system, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, and/or another digital system. In an aspect, the data matrix 108 can be a sparse rating matrix in which at least a portion of information regarding one or more data elements is not included in the data matrix 108. For example, one or more data elements of the data matrix 108 can be void.

In certain embodiments, the first graphics processing unit 102 can be a first hardware component, the second graphics processing unit 104 can be a second hardware component, and the central processing unit can be a third hardware component. The first graphics processing unit 102 and the second graphics processing unit 104 can be communicatively coupled to the central processing unit 106 via a shared memory bus. For example, in certain implementations, the first graphics processing unit 102 and the second graphics processing unit 104 can access the data matrix 108 and/or receive a portion of the data matrix 108 via a corresponding communication bus. Alternatively, the first graphics processing unit 102 can be communicatively coupled to the central processing unit 106 via a first memory bus and the second graphics processing unit 104 can be communicatively coupled to the central processing unit 106 via a second memory bus.

The central processing unit 106 can transmit a first data block (e.g., FIRST DATA BLOCK shown in FIG. 1) of the data matrix 108 to the first graphics processing unit 102. The first data block can be received and/or processed by the first graphics processing unit 102. The first data block can include a set of data elements. For instance, the set of data elements of the first data block can include one or more data elements associated with numerical data (e.g., one or more data elements with a numerical value) and/or one or more data elements associated with void data (e.g., one or more data elements without a numerical value). The first graphics processing unit 102 can analyze and/or process the first data block of the data matrix 108 to generate first information (e.g., FIRST INFORMATION shown in FIG. 1) for the matrix factorization system associated with the data matrix 108. For example, the first information can be a set of resultant information generated as a result of analyzing and/or processing of the first data block by the first graphics processing unit 102. The first information can be learned and/or inferred based on the set of data elements included in the first data block. Additionally or alternatively, the first information can be learned and/or inferred based on one or more other data blocks associated with the data matrix 108.

In an aspect, the first data block can be analyzed and/or processed by a set of processing threads of the first graphics processing unit 102. The set of processing threads can be executed based on a set of policies for scanning, analyzing and/or processing the first data block. For instance, a first processing thread of the first graphics processing unit 102 and a second processing thread of the first graphics processing unit 102 can scan, analyze and/or process the first data block using a particular policy selected from the set of policies. A policy for processing thread(s) of the first graphics processing unit 102 can be, for example, a type of processing performed by the first graphics processing unit 102. In an embodiment, a policy can be a processing policy in which the first data block is divided by the first graphics processing unit 102 into a set of sub-blocks. A first sub-block from the set of sub-blocks can include a first set of data elements, a second sub-block from the set of sub-blocks can include a second set of data elements, etc. In an aspect, a first sub-block of the first data block can be updated, analyzed and/or processed by a first processing thread of the first graphics processing unit 102, a second sub-block of the first data block can be updated, analyzed and/or processed by a second processing thread of the first graphics processing unit 102, etc. In another aspect, the first graphics processing unit 102 can select a policy (e.g., a policy from the set of policies) for the set of sub-blocks of the first data block based on an amount of data elements in the set of sub-blocks of the first data block. Additionally or alternatively, the first graphics processing unit 102 can select a policy (e.g., a policy from the set of policies) for the set of sub-blocks of the first data block based on processing capabilities of the first graphics processing unit 102. The processing capabilities can include, for example, a speed of processing by the first graphics processing unit 102, performance of an atomic operation associated with the first graphics processing unit 102 (e.g., a speed of atomic operation processing in hardware associated with the first graphics processing unit 102), a type of hardware components included in the first graphics processing unit 102, sparseness of data of the first data block associated with the first graphics processing unit 102, etc. The first graphics processing unit 102 can processes a first portion of the first data block separate from a second portion of the first data block to generate the first information for the matrix factorization system. For instance, the first graphics processing unit 102 can processes a first sub-block of the first data block separate from a second sub-block of the first data block (e.g., the first graphics processing unit 102 can processes a first sub-block of the first data block during a first sub-block processing stage, the first graphics processing unit 102 can process a second sub-block of the first data block during a second sub-block processing stage, etc.). The first sub-block processing stage can be performed in parallel to the second sub-block processing stage. Alternatively, the second sub-block processing stage can be performed after the first sub-block processing stage (or the first sub-block processing stage can be performed after the second sub-block processing stage). In certain embodiments, the first graphics processing unit 102 can processes a first portion of the first data block based on a second portion of the first data block to generate the first information for the matrix factorization system. For instance, the first graphics processing unit 102 can processes a first sub-block of the first data block based on a second sub-block of the first data block.

In another embodiment, a policy can be a processing policy in which data elements of the first data block are randomly selected and processed by a set of processing threads of the first graphics processing unit 102. For example, a first processing thread from the set of processing threads of the first graphics processing unit 102 can randomly select, update, analyze and/or process one or more data elements of the first data block, a second processing thread from the set of processing threads of the first graphics processing unit 102 can randomly select, update, analyze and/or process one or more other data elements of the first data block. The set of processing threads of the first graphics processing unit 102 can select, update, analyze and/or process data elements of the first data block without communicating between the set of processing threads (e.g., without employing a locking synchronization mechanism between the set of processing threads). Alternatively, the set of processing threads of the first graphics processing unit 102 can select, update, analyze and/or process data elements of the first data block based on a set of communications between the set of processing threads (e.g., by employing a locking synchronization mechanism). For instance, a first processing thread from the set of processing threads of the first graphics processing unit 102 can randomly select, update, analyze and/or process one or more data elements based on a set of communications with a second processing thread from the set of processing threads of the first graphics processing unit 102. In one example, a first processing thread of the first graphics processing unit 102 can provide feedback and/or a processing status regarding one or more data elements to a second processing thread of the first graphics processing unit 102. In another example, a first processing thread of the first graphics processing unit 102 can wait for a second processing thread of the first graphics processing unit 102 to finish processing one or more data elements before processing one or more other data elements. In an aspect, the first graphics processing unit 102 can select a policy (e.g., a policy from the set of policies) for data element(s) and/or a processing thread(s) of the first graphics processing unit 102 based on an amount of data elements in the first data block. Additionally or alternatively, the first graphics processing unit 102 can select a policy (e.g., a policy from the set of policies) for data element(s) and/or processing thread(s) of the first graphics processing unit 102 based on processing capabilities of the first graphics processing unit 102. The processing capabilities can include, for example, a speed of processing by the first graphics processing unit 102, performance of an atomic operation associated with the first graphics processing unit 102 (e.g., a speed of atomics in hardware associated with the first graphics processing unit 102), a type of hardware components included in the first graphics processing unit 102, specification data of the first graphics processing unit 102, etc. The first graphics processing unit 102 can transmit the first information to the central processing unit 106 in response to a determination that a criterion associated with the first data block is satisfied. For example, the first graphics processing unit 102 can transmit the first information to the central processing unit 106 in response to a determination that processing of the first data block is complete. In certain implementations, the first graphics processing unit 102 can transmit the first information to the central processing unit 106 in response to receiving a signal from the central processing unit 106 that requests transmission of the first data block.

Additionally, the central processing unit 106 can transmit a second data block (e.g., SECOND DATA BLOCK shown in FIG. 1) of the data matrix 108 to the second graphics processing unit 104. The second data block can be received and/or processed by the second graphics processing unit 104. The second data block can include a set of data elements. For example, the set of data elements of the second data block can include one or more data elements associated with numerical data (e.g., one or more data elements with a numerical value) and/or one or more data elements associated with void data (e.g., one or more data elements without a numerical value). The second graphics processing unit 104 can analyze and/or process the second data block of the data matrix 108 to generate second information (e.g., SECOND INFORMATION shown in FIG. 1) for the matrix factorization system associated with the data matrix 108. For example, the second information can be a set of resultant information generated as a result of analyzing and/or processing of the first data block by the second graphics processing unit 104. The second information can be learned and/or inferred based on the set of data elements included in the second data block. Additionally or alternatively, the second information can be learned and/or inferred based on one or more other data blocks associated with the data matrix 108. The second data block processed by the second graphics processing unit 104 can include disjoint features (e.g., mutually exclusive features) as compared to the first data block processed by the first graphics processing unit 102. For example, the second data block can include different data than the first data block. Furthermore, the second data block can include no elements in common with the first data block. In an aspect, the first data block and the second data block can comprise a corresponding size. The first data block and the second data block can be, for example, a rectangular data block. However, it is to be appreciated that the first data block and the second data block can correspond to a different shape with a different ratio of elements.

In an aspect, the second data block can be analyzed and/or processed by a set of processing threads of the second graphics processing unit 104. The set of processing threads can be executed based on a set of policies for scanning, analyzing and/or processing the second data block. For instance, a first processing thread of the second graphics processing unit 104 and a second processing thread of the second graphics processing unit 104 can scan, analyze and/or process the second data block using a particular policy selected from the set of policies. A policy for processing thread(s) of the second graphics processing unit 104 can be, for example, a type of processing performed by the second graphics processing unit 104. In an embodiment, a policy can be a processing policy in which the second data block is divided by the second graphics processing unit 104 into a set of sub-blocks. A first sub-block from the set of sub-blocks can include a first set of data elements, a second sub-block from the set of sub-blocks can include a second set of data elements, etc. In an aspect, a first sub-block of the second data block can be updated, analyzed and/or processed by a first processing thread of the second graphics processing unit 104, a second sub-block of the second data block can be updated, analyzed and/or processed by a second processing thread of the second graphics processing unit 104, etc. In another aspect, the second graphics processing unit 104 can select a policy (e.g., a policy from the set of policies) for the set of sub-blocks of the second data block based on an amount of data elements in the set of sub-blocks of the second data block. Additionally or alternatively, the second graphics processing unit 104 can select a policy (e.g., a policy from the set of policies) for the set of sub-blocks of the second data block based on processing capabilities of the second graphics processing unit 104. The processing capabilities of the second graphics processing unit 104 can include, for example, a speed of processing by the second graphics processing unit 104, performance of an atomic operation associated with the second graphics processing unit 104 (e.g., a speed of atomic operation processing in hardware associated with the second graphics processing unit 104), a type of hardware components included in the second graphics processing unit 104, sparseness of data of the second data block associated with the second graphics processing unit 104, etc. The second graphics processing unit 104 can processes a first portion of the second data block separate from a second portion of the second data block to generate the second information for the matrix factorization system. For instance, the second graphics processing unit 104 can processes a first sub-block of the second data block separate from a second sub-block of the second data block (e.g., the second graphics processing unit 104 can processes a first sub-block of the second data block during a first sub-block processing stage, the second graphics processing unit 104 can processes a second sub-block of the second data block during a second sub-block processing stage, etc.). The first sub-block processing stage can be performed in parallel to the second sub-block processing stage. Alternatively, the second sub-block processing stage can be performed after the first sub-block processing stage (or the first sub-block processing stage can be performed after the second sub-block processing stage). In certain embodiments, the second graphics processing unit 104 can processes a first portion of the second data block based on a second portion of the second data block to generate the second information for the matrix factorization system. For instance, the second graphics processing unit 104 can processes a first sub-block of the second data block based on a second sub-block of the second data block.

In another embodiment, a policy can be a processing policy in which data elements of the second data block are randomly selected and processed by a set of processing threads of the second graphics processing unit 104. For example, a first processing thread from the set of processing threads of second graphics processing unit 104 can randomly select, update, analyze and/or process one or more data elements of the second data block, a second processing thread from the set of processing threads of the second graphics processing unit 104 can randomly select, update, analyze and/or process one or more other data elements of the second data block. The set of processing threads of the second graphics processing unit 104 can select, update, analyze and/or process data elements of the second data block without communicating between the set of processing threads (e.g., without employing a locking synchronization mechanism between the set of processing threads). Alternatively, the set of processing threads of the second graphics processing unit 104 can select, update, analyze and/or process data elements of the second data block based on a set of communications between the set of processing threads (e.g., by employing a locking synchronization mechanism). For instance, a first processing thread from the set of processing threads of the second graphics processing unit 104 can randomly select, update, analyze and/or process one or more data elements based on a set of communications with a second processing thread from the set of processing threads of the second graphics processing unit 104. In one example, a first processing thread of the second graphics processing unit 104 can provide feedback and/or a processing status regarding one or more data elements to a second processing thread of the second graphics processing unit 104. In another example, a first processing thread of the second graphics processing unit 104 can wait for a second processing thread of the second graphics processing unit 104 to finish processing one or more data elements before processing one or more other data elements. In an aspect, the second graphics processing unit 104 can select a policy (e.g., a policy from the set of policies) for one or more data elements and/or a processing thread of the second graphics processing unit 104 based on an amount of data elements in the second data block. Additionally or alternatively, the second graphics processing unit 104 can select a policy (e.g., a policy from the set of policies) for one or more data elements and/or a processing thread of the second graphics processing unit 104 based on processing capabilities of the second graphics processing unit 104. The processing capabilities of the second graphics processing unit 104 can include, for example, a speed of processing by the second graphics processing unit 104, performance of an atomic operation associated with the second graphics processing unit 104 (e.g., a speed of atomics in hardware associated with the second graphics processing unit 104), a type of hardware components included in the second graphics processing unit 104, specification data of the second graphics processing unit 104, etc. The second graphics processing unit 104 can transmit the second information to the central processing unit 106 in response to a determination that a criterion associated with the second data block is satisfied. For example, the second graphics processing unit 104 can transmit the second information to the central processing unit 106 in response to a determination that processing of the second data block is complete. In certain implementations, the second graphics processing unit 104 can transmit the second information to the central processing unit 106 in response to receiving a signal from the central processing unit 106 that requests transmission of the second data block.

In certain embodiments, the first graphics processing unit 102 and the second graphics processing unit 104 can process the data matrix 108 in parallel to facilitate a stochastic gradient descent technique associated with a stochastic approximation and/or determination of one or more data elements (e.g., one or more void data elements) of the data matrix 108. Furthermore, the central processing unit 106 can employ information provided by at least the first graphics processing unit 102 and the second graphics processing unit 104 to perform a matrix factorization process. For example, central processing unit 106 can merge updated features from different data blocks provided by the first graphics processing unit 102 and the second graphics processing unit 104. As such, performance of the central processing unit 106 with respect to a matrix factorization process (e.g., a speed for performing a matrix factorization process) can be improved as compared to a scenario in which the central processing unit 106 performs the matrix factorization process without the first graphics processing unit 102 and the second graphics processing unit 104. In an aspect, the central processing unit 106 can generates a machine learning model (e.g., MACHINE LEARNING MODEL shown in FIG. 1) for the matrix factorization system based on at least the first information provided by the first graphics processing unit 102 and the second information provided by the second graphics processing unit 104. The machine learning model can be a model for a stochastic gradient descent process associated with the data matrix 108.

In another embodiment, the central processing unit 106 can divide the data matrix 108 into a set of data blocks. The central processing unit 106 can divide the data matrix 108 into the set of data blocks prior to the processing of the data matrix 108 by the first graphics processing unit 102 and the second graphics processing unit 104. For example, the central processing unit 106 can determine the first data block processed by the first graphics processing unit 102. Furthermore, the central processing unit 106 can determine the second data block processed by the second graphics processing unit 104. In an aspect, the central processing unit 106 can divide the data matrix 108 into the set of data blocks based on features associated with the data matrix 108. The feature can include, for example, a number of rows and columns of the data matrix 108, a size of the data matrix 108, a shape of the data matrix 108, other features of the data matrix 108, etc. In another embodiment, the central processing unit 106 can dispatch the first data block to the first graphics processing unit 102 and the second data block to the second graphics processing unit 104. For example, the central processing unit 106 can initiate a dispatch process that transmits the first data block to the first graphics processing unit 102 and the second data block to the second graphics processing unit 104.

It is to be appreciated that the first graphics processing unit 102, the second graphics processing unit 104 and/or the central processing unit 106 perform a matrix factorization process associated with a data matrix (e.g., data matrix 108) that cannot be performed by a human (e.g., is greater than the capability of a single human mind). For example, an amount of data processed, a speed of processing of data and/or data types processed by the first graphics processing unit 102, the second graphics processing unit 104 and/or the central processing unit 106 over a certain period of time with respect to the matrix factorization process can be greater, faster and different than an amount, speed and data type that can be processed by a single human mind over the same period of time. The first graphics processing unit 102, the second graphics processing unit 104 and/or the central processing unit 106 can also be fully operational towards performing one or more other functions (e.g., fully powered on, fully executed, etc.) while also performing the above-referenced matrix factorization process. Moreover, a machine learning model generated by the central processing unit 106 can include information that is impossible to obtain manually by a user. For example, an amount of information included in the machine learning model generated by the central processing unit 106 and/or a variety of information included in the machine learning model generated by the central processing unit 106 can be more complex than information obtained manually by a user.

In certain embodiments, aspects of the first graphics processing unit 102, the second graphics processing unit 104 and/or the central processing unit 106 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the first graphics processing unit 102, the second graphics processing unit 104 and/or the central processing unit 106 can also include memory that stores computer executable components and instructions. Furthermore, the first graphics processing unit 102, the second graphics processing unit 104 and/or the central processing unit 106 can include and/or be implemented as a processor to facilitate execution of the instructions (e.g., computer executable components and corresponding instructions) by the first graphics processing unit 102, the second graphics processing unit 104 and/or the central processing unit 106.

Figure 2:
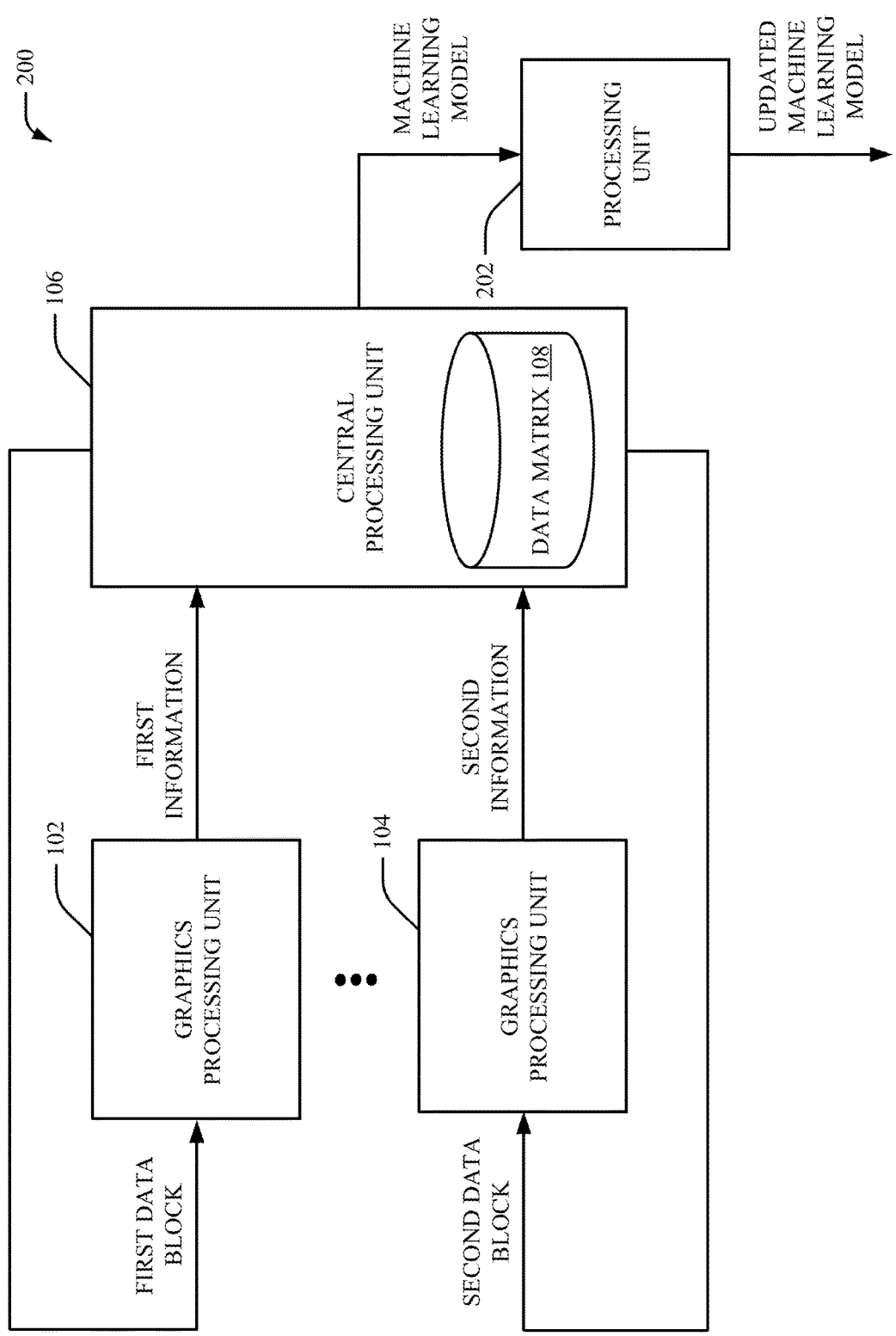
FIG. 2 illustrates a block diagram of another example, non-limiting system to facilitate matrix factorization associated with graphics processing units in accordance with one or more embodiments described herein.

FIG. 2 illustrates another block diagram of an example, non-limiting system 200 in accordance with one or more embodiments described herein. Repetitive description of like elements employed in other embodiments described herein is omitted for sake of brevity.

In the embodiment shown in FIG. 2, the system 200 can include the first graphics processing unit 102, the second graphics processing unit 104, the central processing unit 106, and processing unit 202. The central processing unit 106 can include the data matrix 108. The processing unit 202 can be an accelerator processing unit. For example, the processing unit 202 can be a hardware accelerator for the central processing unit 106 with a computer architecture that is designed for processing at least a portion of the machine learning model at a faster rate and/or more efficiently than the central processing unit 106. Additionally or alternatively, the processing unit 202 can be a co-processor for the central processing unit 106. For example, the processing unit 202 and the central processing unit 106 can collaboratively generate the machine learning model. In one example, the processing unit 202 can be a field-programmable gate array. In another example, the processing unit 202 can be an integrated circuit (e.g., an application-specific integrated circuit). The processing unit 202 can generate an updated machine learning model (e.g., UPDATED MACHINE LEARNING MODEL shown in FIG. 2) based on the machine learning model generated by the central processing unit 106. For instance, the updated machine learning model can be a modified version of the machine learning model. Additionally or alternatively, the processing unit 202 can generate the updated machine learning model based on at least the first information provided by the first graphics processing unit 102 and the second information provided by the second graphics processing unit 104. For example, the machine learning model can be further processed by the processing unit 102 based on at least the first information provided by the first graphics processing unit 102 and the second information provided by the second graphics processing unit 104. In an embodiment, the processing unit 202 can process and/or generate a portion of the updated machine learning model and the central processing unit 106 can process and/or generate another portion of the updated machine learning model.

Figure 3:
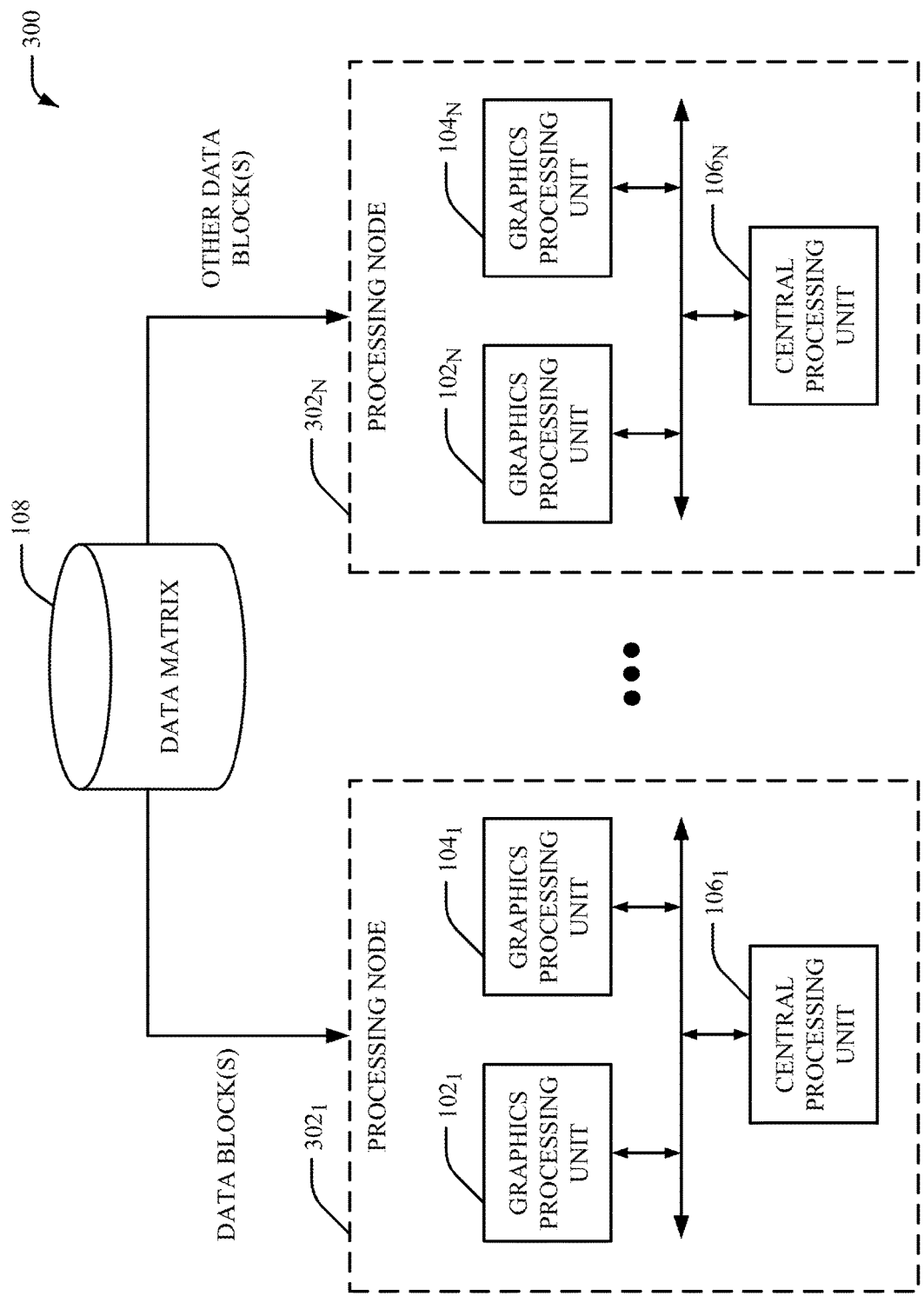
FIG. 3 illustrates a block diagram of yet another example, non-limiting system to facilitate matrix factorization associated with graphics processing units in accordance with one or more embodiments described herein.

FIG. 3 illustrates another block diagram of an example, non-limiting system 300 in accordance with one or more embodiments described herein. Repetitive description of like elements employed in other embodiments described herein is omitted for sake of brevity.

The system 300 can include the data matrix 108, a processing node $302_1$ and a processing node $302_N$, in which N is an integer greater than or equal to 2. The processing node $302_1$ can be a first computer node and the processing node $302_N$ can be a Nth processing node. As such, the system 300 can include multiple computer nodes with multiple graphic processing units and/or multiple central processing units. In the embodiment shown in FIG. 3, the processing node $302_1$ can include a first graphics processing unit $102_1$, a second graphics processing unit $104_1$, and a central processing unit $106_1$. Additionally, the processing node $302_N$ can include a first graphics processing unit $102_N$, a second graphics processing unit $104_N$, and a central processing unit $106_N$. The first graphics processing unit $102_1$ and/or the first graphics processing unit $102_N$ can correspond to, for example, the first graphics processing unit. Furthermore, the second graphics processing unit $104_1$ and/or the second graphics processing unit $104_N$ can correspond to, for example, the second graphics processing unit 104. The central processing unit $106_1$ and/or the central processing unit $106_N$ can correspond to, for example, the central processing unit 106. Accordingly, the system 300 can be implemented as two or more levels of processing with respect to a matrix factorization process. In an embodiment, the central processing unit $106_1$ can include the data matrix 108. In another embodiment, the central processing unit $106_N$ can include the data matrix 108. In yet another embodiment, the central processing unit $106_1$ can include a portion of the data matrix 108 and the central processing unit $106_N$ can include another portion of the data matrix 108. In yet another embodiment, another central processing unit can include the data matrix 108 or a portion of the data matrix 108.

The system 300 can provide improved performance for the matrix factorization process. In an aspect, one or more data blocks (e.g., DATA BLOCK(S) shown in FIG. 3) of the data matrix 108 can be provided to the processing node $302_1$. Furthermore, one or more other data blocks (e.g., OTHER DATA BLOCK(S) shown in FIG. 3) of the data matrix 108 can be provided to the processing node $302_N$. The first graphics processing unit $102_1$ and the second graphics processing unit $104_1$ of the processing node $302_1$ can process the one or more data blocks. Information generated by the first graphics processing unit $102_1$ and the second graphics processing unit $104_1$ in response to the one or more data blocks can be transmitted to the central processing unit $106_1$. The central processing unit $106_1$ can process and/or generate at least a portion of a machine learning model based on the information generated by the first graphics processing unit $102_1$ and the second graphics processing unit $104_1$. Similarly, first graphics processing unit $102_N$ and the second graphics processing unit $104_N$ of the processing node $302_N$ can process the one or more other data blocks. Information generated by the first graphics processing unit $102_N$ and the second graphics processing unit $104_N$ in response to the one or more other data blocks can be transmitted to the central processing unit $106_N$. The central processing unit $106_N$ can process and/or generate at least a portion of a machine learning model based on the information generated by the first graphics processing unit $102_N$ and the second graphics processing unit $104_N$. In an embodiment, the central processing unit $106_1$ can process and/or generate a first portion of a particular machine learning model and the central processing unit $106_N$ can process and/or generate a second portion of the particular machine learning model.

Figure 4:
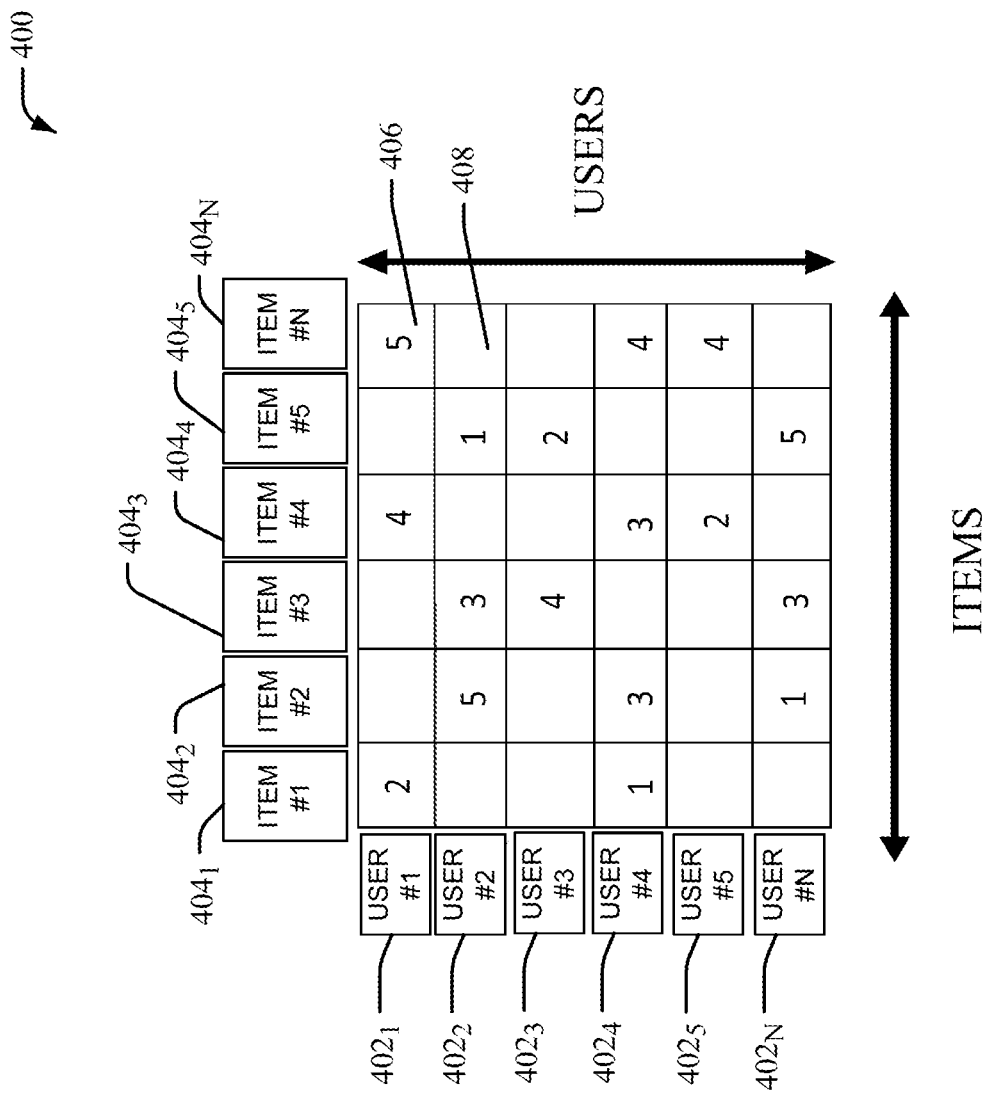
FIG. 4 illustrates an example, non-limiting data matrix associated with matrix factorization in accordance with one or more embodiments described herein.

FIG. 4 illustrates another block diagram of an example, non-limiting data matrix 400 associated with matrix factorization in accordance with one or more embodiments described herein. Repetitive description of like elements employed in other embodiments described herein is omitted for sake of brevity.

The data matrix 400 can, for example, correspond to the data matrix 108. The data matrix 400 can provide matrix factorization for a recommendation system. The data matrix 400 can also be employed during a cognitive computing process associated with an artificial intelligence learning system. The data matrix 400 can include data associated with a set of users $402_{1-N}$ and a set of items $404_{1-N}$. For example, the set of users $402_{1-N}$ can correspond to a set of user identities in a recommendation system. Furthermore, the set of items $404_{1-N}$ can be a set of items that are rated by the set of users $402_{1-N}$. The set of items $404_{1-N}$ can include, but is not limited to, a set of movies, a set of songs, a set of books, a set of products, a set of restaurants, a set of internet search queries, a set of social tags, a set of items for purchase, a set of services, a set of other items, etc. In an example, a data block 406 of the data matrix 400 can correspond to a rating for an item $404_N$ by a user $402_1$. For instance, the user $402_1$ can rate the item $404_N$ with a rating "5". In another example, a data block 408 of the data matrix 400 can correspond to an item $404_N$ that is not rated by a user $402_2$. For instance, the data block 408 can be void since the user $402_2$ did not provide a rating for the item $404_N$.

In an aspect, the data matrix 400 can be input data provided to the first graphics processing unit 102 and/or the second graphics processing unit 104. For example, the first graphics processing unit 102 can process a first portion of the data matrix 400 and the second graphics processing unit 104 can process a second portion of the data matrix 400. In another aspect, the first graphics processing unit 102 can process the first portion of the data matrix 400 and the second graphics processing unit 104 can process the second portion of the data matrix 400 to facilitate determination of missing data in the data matrix 400. For example, the first graphics processing unit 102 and/or the second graphics processing unit 104 can process one or more data blocks of the data matrix 400 to facilitate determination of a rating of the data block 408 of the data matrix 400.

The data matrix 400 can correspond to a rating matrix R. The first graphics processing unit 102, the second graphics processing unit 104 and/or the central processing unit 106 can factorize the rating matrix R into $R \approx X \cdot \theta^T$, in which X corresponds to a low rank matrix associated with the set of users $402_{1-N}$ and $\theta^T$ corresponds to a low rank matrix associated with the set of set of items $404_{1-N}$. The first graphics processing unit 102, the second graphics processing unit 104 and/or the central processing unit 106 can collaboratively process the data matrix 400 (e.g., the rating matrix R) to, for example, minimize error with respect to missing data of the data matrix 400 (e.g., minimize error over observed ratings). For example, the first graphics processing unit 102, the second graphics processing unit 104 and/or the central processing unit 106 can collaboratively process the data matrix 400 to minimize error of a cost function J associated with machine learning. The cost function J can be equal to, for example:

$$J = \sum_{u,v}(r_{u,v} - x_u^T \theta_v)^2 + \lambda\left(\sum_u n_{x_u}\|x_u\|^2 + \sum_v n_{\theta_v}\|\theta_v\|^2\right)$$

in which $r_{uv}$ is a value of the rating matrix R at a position (u,v), $x_u$ is a uth row for the low rank matrix X, $\theta_v$ is a with column for the low rank matrix $\theta^T$, and $\lambda$ is a regularization parameter associated with the cost function J.

The first graphics processing unit 102, the second graphics processing unit 104 and/or the central processing unit 106 can collaboratively process the data matrix 400 during a stochastic gradient descent process associated with the cost function J. For the stochastic gradient descent process the variable x, and the variable $\theta_v$ can be equal to:

$x_u = x_u - \alpha[(x_u^T\theta_v = r_{uv})\theta_v + \lambda x_u]$ $\theta_v = \theta_v - \alpha[(x_u^T\theta_v = r_{uv})x_u + \lambda\theta_v]$ in which $\alpha$ is a learning rate for the stochastic gradient descent process.

Figure 5:
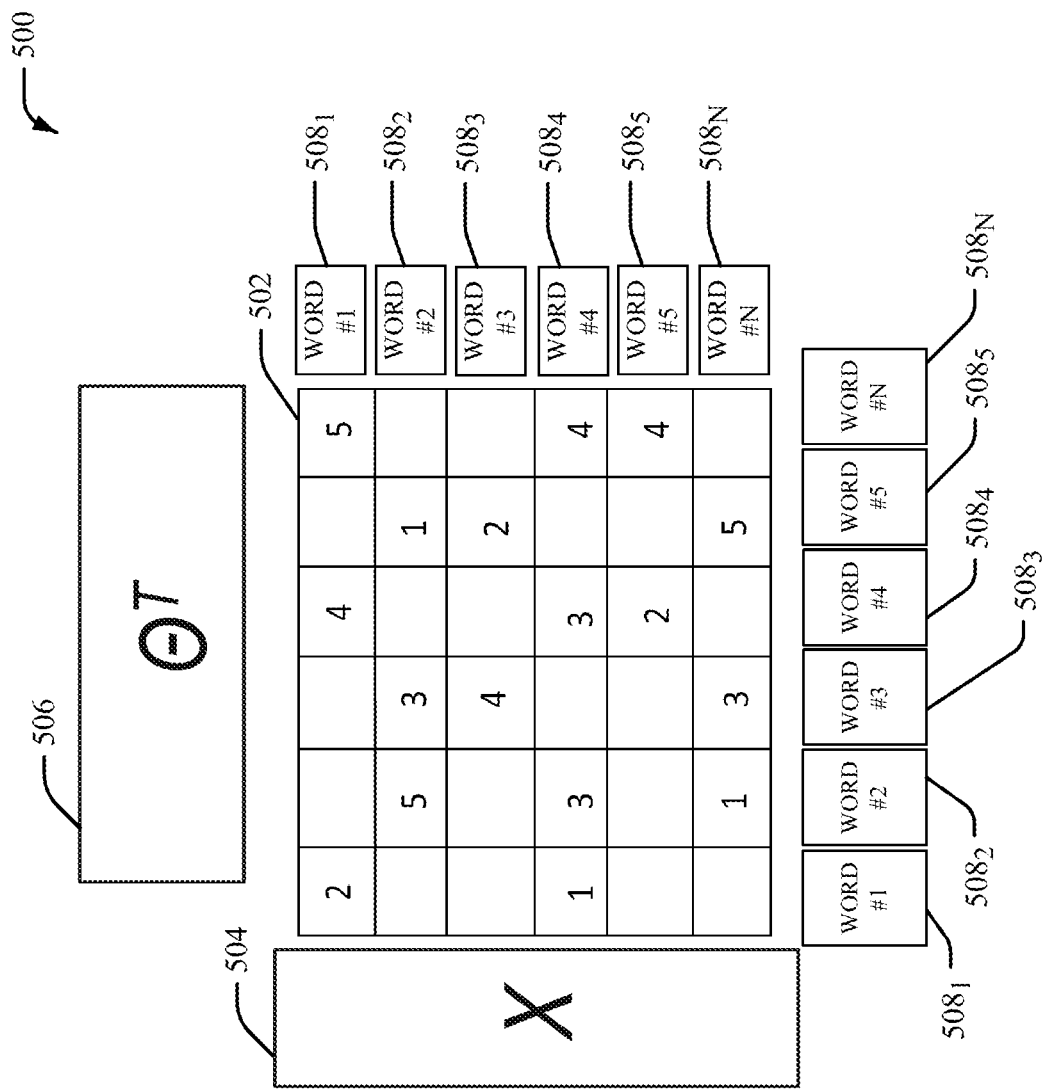
FIG. 5 illustrates an example, non-limiting system associated with matrix factorization in accordance with one or more embodiments described herein.

FIG. 5 illustrates another block diagram of an example, non-limiting system 500 associated with matrix factorization in accordance with one or more embodiments described herein. Repetitive description of like elements employed in other embodiments described herein is omitted for sake of brevity.

The system 500 can include a data matrix 502, a data matrix 504, and a data matrix 506. The data matrix 502 can, for example, correspond to the data matrix 108. The system 500 can be associated with a word embedding system for natural language processing. For example, the data matrix 502 can provide matrix factorization for a word embedding system. The data matrix 502 can also be employed during a cognitive computing process associated with an artificial intelligence learning system. The data matrix 502 can include data associated with a set of words $508_{1-N}$. The set of words $508_{1-N}$ can be a set of parameterized functions that maps a representation of one or more words in a particular language to a set of numerical vectors. In an aspect, the data matrix 502 can be input data provided to the first graphics processing unit 102 and/or the second graphics processing unit 104. For example, the first graphics processing unit 102 can process a first portion of the data matrix 502 and the second graphics processing unit 104 can process a second portion of the data matrix 502. In another aspect, the first graphics processing unit 102 can process the first portion of the data matrix 502 and the second graphics processing unit 104 can process the second portion of the data matrix 502 to facilitate determination of missing data in the data matrix 502. The data matrix 502 can correspond to a rating matrix R. The first graphics processing unit 102, the second graphics processing unit 104 and/or the central processing unit 106 can factorize the data matrix 502 into the data matrix 504 and the data matrix 506.

For example, the data matrix 504 can be a low rank matrix X associated with the set of words $508_{1-N}$. Furthermore, the data matrix 506 can be a low rank matrix $\theta^T$ that is also associated with the set of words $508_{1-N}$.

Figure 6:
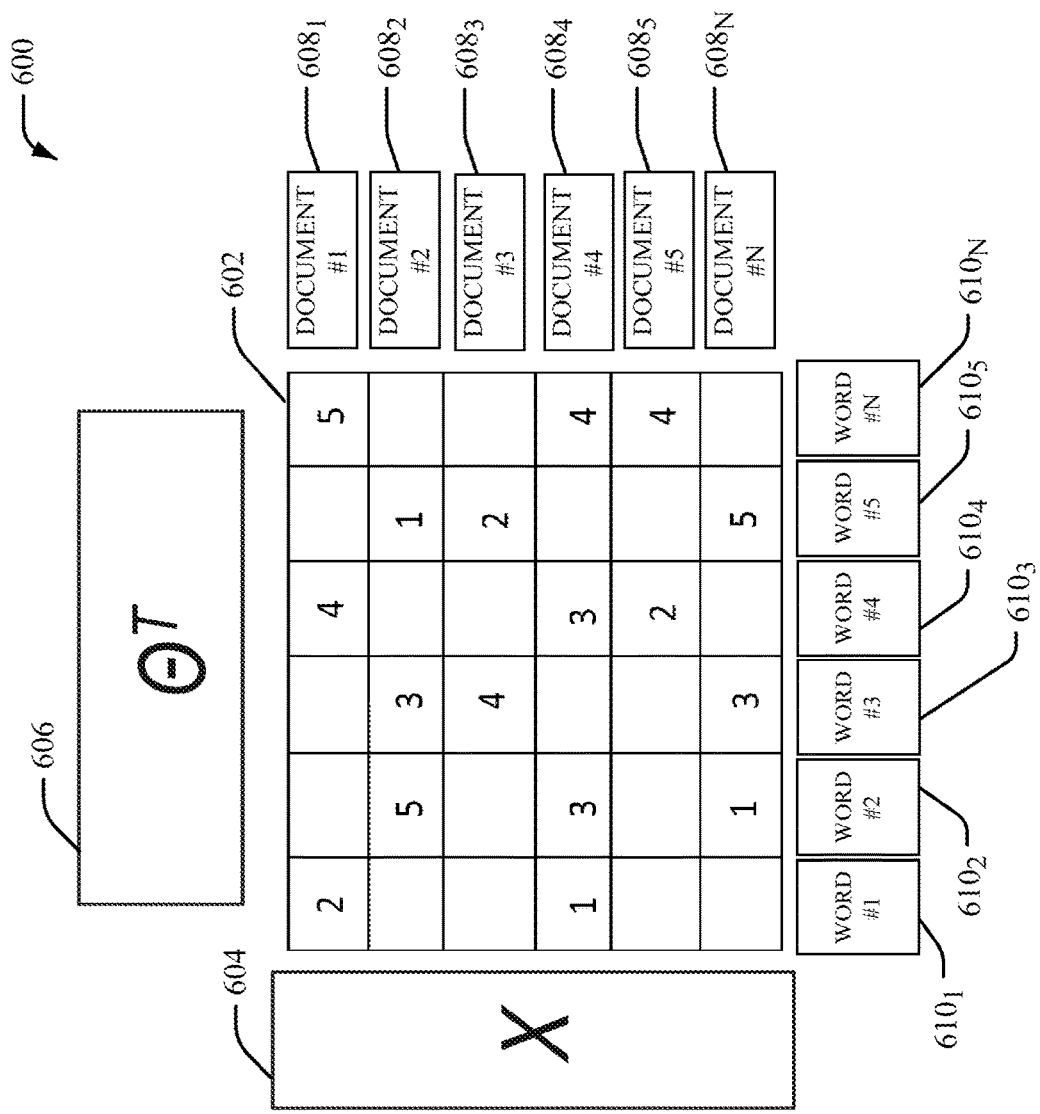
FIG. 6 illustrates another example, non-limiting system associated with matrix factorization in accordance with one or more embodiments described herein.

FIG. 6 illustrates another block diagram of an example, non-limiting system 600 associated with matrix factorization in accordance with one or more embodiments described herein. Repetitive description of like elements employed in other embodiments described herein is omitted for sake of brevity.

The system 600 can include a data matrix 602, a data matrix 604, and a data matrix 606. The data matrix 602 can, for example, correspond to the data matrix 108. The system 600 can be associated with a topic model system for identifying discovering a topic that occurs in a collection of documents during a machine learning process. For example, the data matrix 602 can provide matrix factorization for a topic model system. The data matrix 602 can also be employed during a cognitive computing process associated with an artificial intelligence learning system. The data matrix 602 can include data associated with a set of documents $608_{1-N}$ and a set of words $610_{1-N}$. The set of documents $608_{1-N}$ can be a set of parameterized function that maps a representation of content included in the set of set of documents $608_{1-N}$ into a set of numerical vectors. Furthermore, the set of words $510_{1-N}$ can be a set of parameterized function that maps a representation of one or more words in a particular language to a set of numerical vectors. The set of words $610_{1-N}$ can facilitate detection of one or more topics included in the set of documents $608_{1-N}$. In an aspect, the data matrix 602 can be input data provided to the first graphics processing unit 102 and/or the second graphics processing unit 104. For example, the first graphics processing unit 102 can process a first portion of the data matrix 602 and the second graphics processing unit 104 can process a second portion of the data matrix 602. In another aspect, the first graphics processing unit 102 can process the first portion of the data matrix 602 and the second graphics processing unit 104 can process the second portion of the data matrix 602 to facilitate determination of missing data in the data matrix 602. The data matrix 602 can correspond to a rating matrix R. The first graphics processing unit 102, the second graphics processing unit 104 and/or the central processing unit 106 can factorize the data matrix 602 into the data matrix 604 and the data matrix 606. For example, the data matrix 604 can be a low rank matrix X associated with the set of documents $608_{1-N}$. Furthermore, the data matrix 606 can be a low rank matrix $\theta^T$ associated with the set of words $610_{1-N}$.

Figure 7:
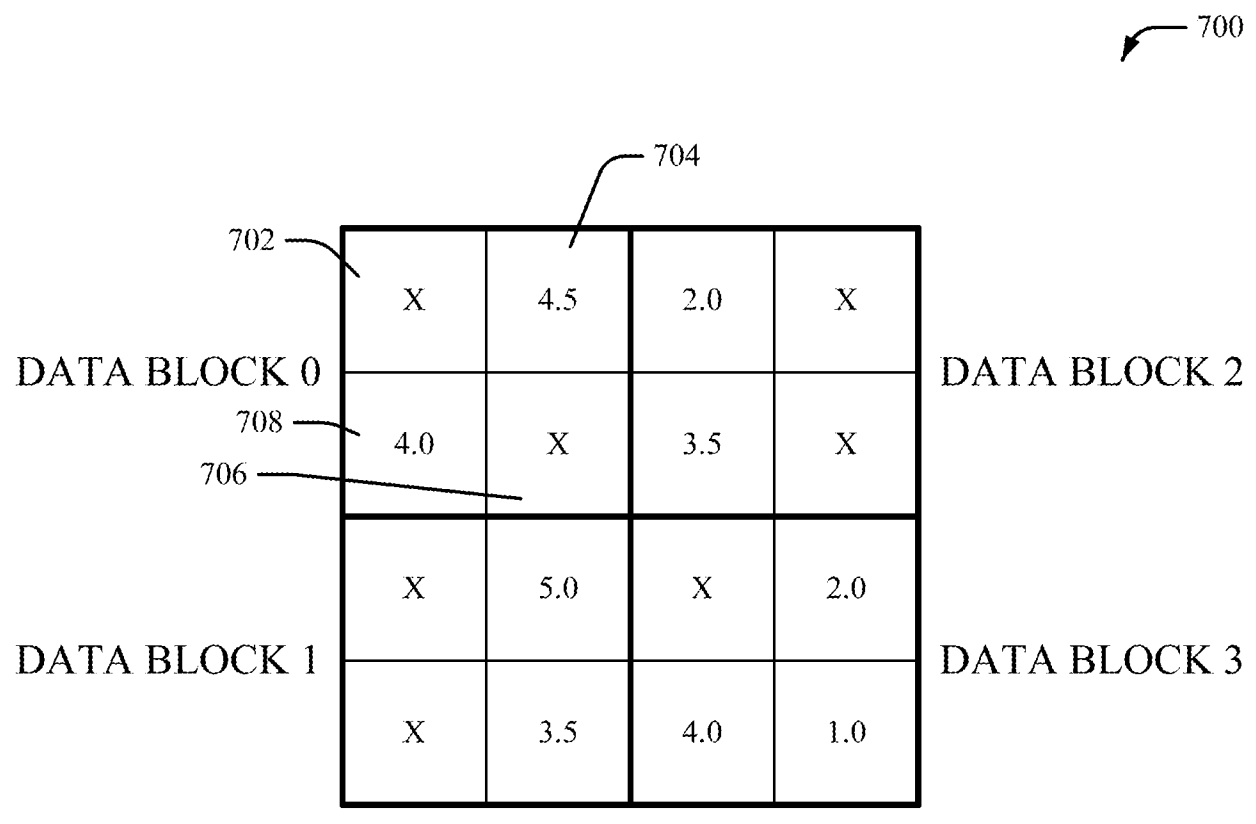

FIG. 7 illustrates another block diagram of an example, non-limiting data matrix 700 in accordance with one or more embodiments described herein. Repetitive description of like elements employed in other embodiments described herein is omitted for sake of brevity.

The data matrix 700 can, for example, correspond to the data matrix 108. As shown in FIG. 7, the data matrix 700 can include a first data block 0, a second data block 1, a third data block 2, and a fourth data block 3. The first data block 0, the second data block 1, the third data block 2, and the fourth data block 3 can be a Level-1 data block (e.g., a top-level data block) that is formed based on data elements included in the data matrix 700. Furthermore, the first data block 0, the second data block 1, the third data block 2, and the fourth data block 3 can be rectangular data blocks that include a set of data elements. For instance, the first data block 0 can include a first data element 702, a second data element 704, a third data element 706, and a fourth data element 708. In one example, the data matrix 700 can correspond to the data matrix 400, the data matrix 502 or the data matrix 602. The first data element 702 can correspond to a data element with a null value (e.g., a missing data element), the second data element 704 can correspond to a data element with a value equal to 4.5, the third data element 706 can correspond to a data element with a null value (e.g., a missing data element), and the fourth data element 708 can correspond to a data element with a value equal to 4.0.

The first data block 0, the second data block 1, the third data block 2, and/or the fourth data block 3 can, for example, correspond to a data block provided to the first graphics processing unit 102 and/or the second graphics processing unit 104. In a non-limiting example, the first data block 0 can be provided to and/or processed by the first graphics processing unit 102, the fourth data block 3 can be provided to and/or processed by the second graphics processing unit 104, etc. Furthermore, the central processing unit 106 can process and/or generate a machine learning model based on information generated by the first graphics processing unit 102 with respect to the first data block 0, based on information generated by the second graphics processing unit 104 with respect to the fourth data block 3, etc. Since the first data block 0 and the fourth data block 3 do not have overlapping features (e.g., do not have overlapping row and columns), the data matrix 700 can be processed without communication between the first graphics processing unit 102 and the second graphics processing unit 104. In an embodiment, the central processing unit 106 can divide the data matrix 700 into the first data block 0, the second data block 1, the third data block 2, and the fourth data block 3. For example, the central processing unit 106 can divide the data matrix 700 into the first data block 0, the second data block 1, the third data block 2, and the fourth data block 3 based on a number of data elements in the data matrix 700, a defined size of a data block and/or a defined shape of a data block. In an aspect, the first data block 0, the second data block 1, the third data block 2, and the fourth data block 3 can include disjoint features such that rows and columns of the first data block 0, the second data block 1, the third data block 2, and the fourth data block 3 are mutually exclusive. For example, the first data block 0 can include disjoint features as compared to the fourth data block 3, the second data block 1 can include disjoint features as compared to the third data block, the third data block 2 can include disjoint features as compared to the second data block 1, and the fourth data block 3 can include disjoint features as compared to the first data block 0. As such, computation with respect to the first data block 0 and the fourth data block 3 can be unrelated and can be performed concurrently. Furthermore, computation with respect to the second data block 1 and the third data block 2 can be unrelated and can be performed concurrently.

Figure 8:
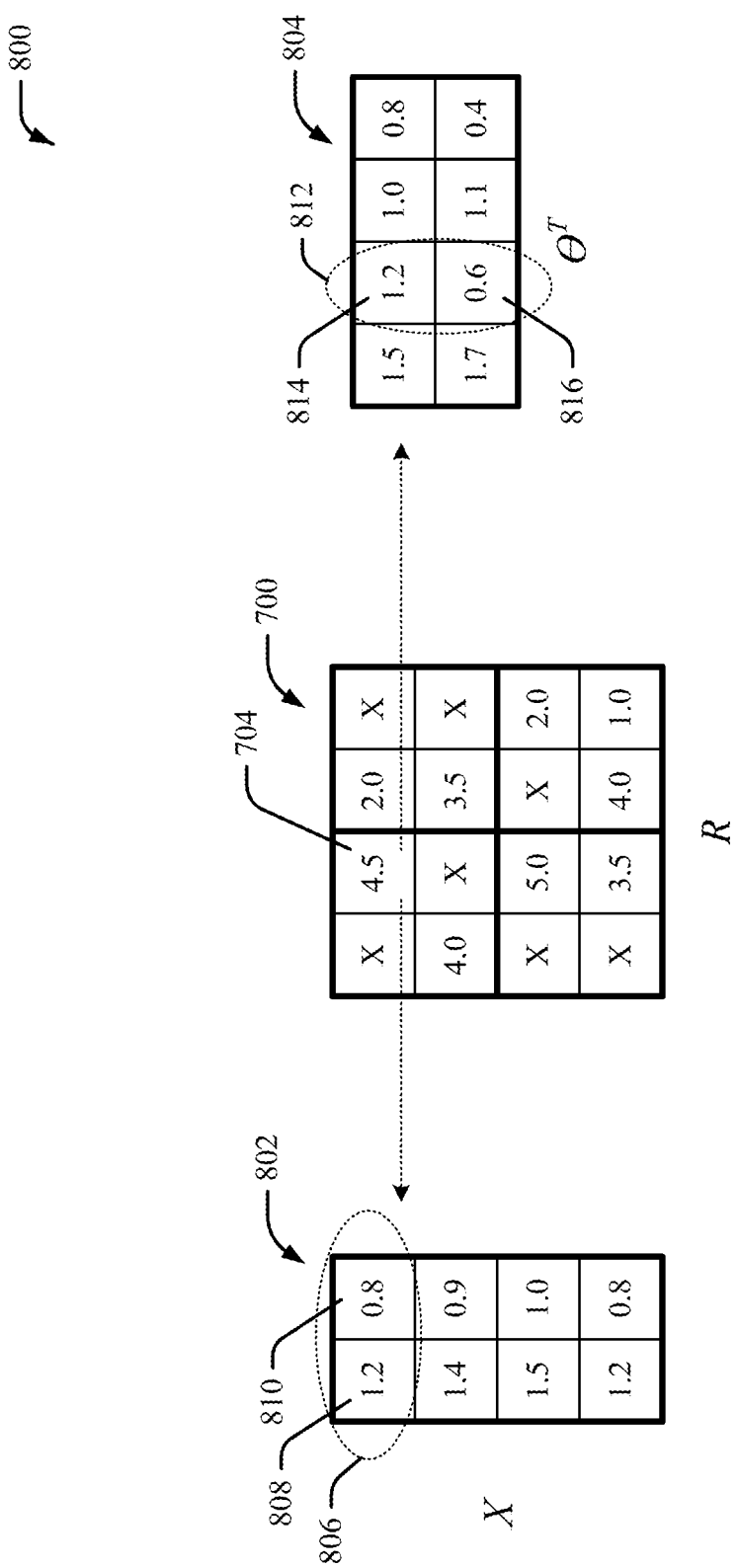
FIG. 8 illustrates an example non-limiting system associated with a stochastic gradient descent process in accordance with one or more embodiments described herein.

FIG. 8 illustrates a block diagram of an example, non-limiting system 800 associated with a stochastic gradient descent process in accordance with one or more embodiments described herein. Repetitive description of like elements employed in other embodiments described herein is omitted for sake of brevity.

The system 800 can include the data matrix 700, a data matrix 802 and a data matrix 804. The data matrix 700 can correspond to a rating matrix R, the data matrix 802 can correspond to a low rank matrix X, and the data matrix 804 can correspond to a low rank matrix $\theta^T$. One or more blocks from the data matrix 700 can be divided into sub-blocks. For example, the data matrix 700 can be divided into the first data block 0, the second data block 1, the third data block 2, and the fourth data block 3. Furthermore, the first data block 0 can be sub-divided into a first set of sub-blocks, the second data block 1 can be sub-divided into a second set of sub-blocks, the third data block 2 can be sub-divided into a third set of sub-blocks, and the fourth data block 3 can be sub-divided into four set of sub-blocks. In an aspect, the second data element 704 of the first data block 0 can be associated with row 806 stored in the data matrix 802. The row 806 can include a first column 808 with a value equal to 1.2 and a second column 810 with a value equal to 0.8. Additionally, the second data element 704 of the first data block 0 can be associated with a column 812 stored in the data matrix 804. The column 812 can include a first row 814 with a value equal to 1.2 and a second row 816 with a value equal to 0.6.

Figure 9:
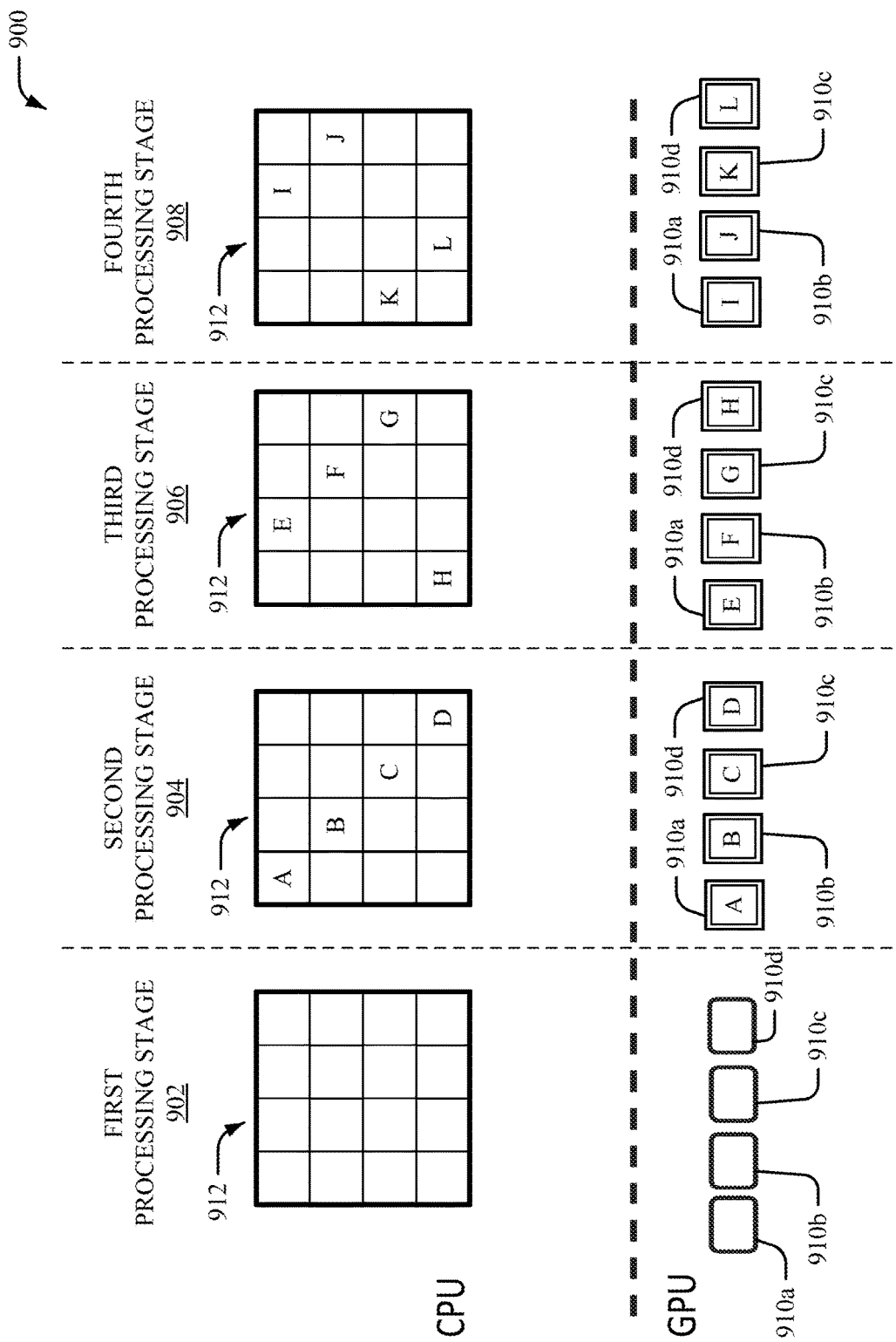
FIG. 9 illustrates an example, non-limiting system associated with multiple processing stages for matrix factorization in accordance with one or more embodiments described herein.

FIG. 9 illustrates a block diagram of an example, non-limiting system 900 associated with multiple processing stages for matrix factorization in accordance with one or more embodiments described herein. Repetitive description of like elements employed in other embodiments described herein is omitted for sake of brevity.

The system 900 can include a first processing stage 902, a second processing stage 904, a third processing stage 906 and a fourth processing stage 908. The system 900 can also include a first graphics processing unit 910a, a second graphics processing unit 910b, a third graphics processing unit 910c and a fourth graphics processing unit 910d. In an example, the first graphics processing unit 102 can correspond to a graphics processing unit from the first graphics processing unit 910a, the second graphics processing unit 910b, the third graphics processing unit 910c and the fourth graphics processing unit 910d. Furthermore, the second graphics processing unit 104 can correspond to another graphics processing unit from the first graphics processing unit 910a, the second graphics processing unit 910b, the third graphics processing unit 910c and the fourth graphics processing unit 910d.

The first processing stage 902, the second processing stage 904, the third processing stage 906 and the fourth processing stage 908 can be processing stages of a global stage in which a data matrix 912 is divided into a set of data blocks (e.g., a set of Level-1 data blocks) and the data blocks from the set of data blocks are dispatched to the first graphics processing unit 910a, the second graphics processing unit 910b, the third graphics processing unit 910c and the fourth graphics processing unit 910d to facilitate processing of the data blocks by the first graphics processing unit 910a, the second graphics processing unit 910b, the third graphics processing unit 910c and the fourth graphics processing unit 910d. The data matrix 912 can, for example, correspond to the data matrix 108.

A central processing unit (e.g., the central processing unit 106) can divide the data matrix 912 into a set of data blocks during the first processing stage 902. The central processing unit (e.g., the central processing unit 106) can also be in communication with the first graphics processing unit 910a, the second graphics processing unit 910b, the third graphics processing unit 910c and the fourth graphics processing unit 910d. During the second processing stage, the central processing unit (e.g., the central processing unit 106) can select a data block for processing by the first graphics processing unit 910a, the second graphics processing unit 910b, the third graphics processing unit 910c and the fourth graphics processing unit 910d, respectively. For example, during the second processing stage, the central processing unit (e.g., the central processing unit 106) can select a data block A for processing by the first graphics processing unit 910a, a data block B for processing by the second graphics processing unit 910b, a data block C for processing by the third graphics processing unit 910c, and a data block D for processing by the fourth graphics processing unit 910d. Furthermore, during the second processing stage, the first graphics processing unit 910a can process the data block A, the second graphics processing unit 910b can process the data block B, the third graphics processing unit 910c can process the data block C, and the fourth graphics processing unit 910d can process the data block D. The data block A, the data block B, the data block C and the data block D can comprise disjoint features. For example, a row and column of the data block A can be different that rows and columns of the data block B, the data block C and the data block D; a row and column of the data block B can be different that rows and columns of the data block A, the data block C and the data block D; a row and column of the data block C can be different that rows and columns of the data block A, the data block B and the data block D; and a row and column of the data block D can be different that rows and columns of the data block A, the data block B and the data block C. Therefore, the data block A, the data block B, the data block C and the data block D can comprise different data (e.g., unique data elements) and can update different features (e.g., rows of the data matrix 802 corresponding to low rank matrix X, and columns of the data matrix 804 corresponding to low rank matrix $\theta^T$).

During the third processing stage, the central processing unit (e.g., the central processing unit 106) can select another data block for processing by the first graphics processing unit 910a, the second graphics processing unit 910b, the third graphics processing unit 910c and the fourth graphics processing unit 910d, respectively. For example, during the third processing stage, the central processing unit (e.g., the central processing unit 106) can select a data block E for processing by the first graphics processing unit 910a, a data block F for processing by the second graphics processing unit 910b, a data block G for processing by the third graphics processing unit 910c, and a data block H for processing by the fourth graphics processing unit 910d. Furthermore, during the third processing stage, the first graphics processing unit 910a can process the data block E, the second graphics processing unit 910b can process the data block F, the third graphics processing unit 910c can process the data block G, and the fourth graphics processing unit 910d can process the data block H. The data block E, the data block F, the data block G and the data block H can comprise disjoint features. For example, a row and column of the data block E can be different that rows and columns of the data block F, the data block G and the data block H; a row and column of the data block F can be different that rows and columns of the data block E, the data block G and the data block H; a row and column of the data block G can be different that rows and columns of the data block E, the data block F and the data block H; and a row and column of the data block H can be different that rows and columns of the data block E, the data block F and the data block G. Therefore, the data block E, the data block F, the data block G and the data block H can comprise different data (e.g., unique data elements) and can update different features (e.g., rows of the data matrix 802 corresponding to low rank matrix X, and columns of the data matrix 804 corresponding to low rank matrix $\theta^T$).

Moreover, during the fourth processing stage, the central processing unit (e.g., the central processing unit 106) can select yet another data block for processing by the first graphics processing unit 910a, the second graphics processing unit 910b, the third graphics processing unit 910c and the fourth graphics processing unit 910d, respectively. For example, during the fourth processing stage, the central processing unit (e.g., the central processing unit 106) can select a data block I for processing by the first graphics processing unit 910a, a data block J for processing by the second graphics processing unit 910b, a data block K for processing by the third graphics processing unit 910c, and a data block L for processing by the fourth graphics processing unit 910d. Furthermore, during the third processing stage, the first graphics processing unit 910a can process the data block I, the second graphics processing unit 910b can process the data block J, the third graphics processing unit 910c can process the data block K, and the fourth graphics processing unit 910d can process the data block L. The data block I, the data block J, the data block K and the data block L can comprise disjoint features. For example, a row and column of the data block I can be different that rows and columns of the data block J, the data block K and the data block L; a row and column of the data block J can be different that rows and columns of the data block I, the data block K and the data block L; a row and column of the data block K can be different that rows and columns of the data block I, the data block J and the data block L; and a row and column of the data block L can be different that rows and columns of the data block I, the data block J and the data block K. Therefore, the data block I, the data block J, the data block L and the data block L can comprise different data (e.g., unique data elements) and can update different features (e.g., rows of the data matrix 802 corresponding to low rank matrix X, and columns of the data matrix 804 corresponding to low rank matrix $\theta^T$). The first graphics processing unit 910a, the second graphics processing unit 910b, the third graphics processing unit 910c and the fourth graphics processing unit 910d can continue processing data blocks of the data matrix 912 until a defined criterion is satisfied with respect to the data matrix 912 and/or a machine learning model generated by the central processing unit (e.g., the central processing unit 106). For example, first graphics processing unit 910a, the second graphics processing unit 910b, the third graphics processing unit 910c and the fourth graphics processing unit 910d can continue processing data blocks of the data matrix 912 until processing of the data matrix 912 and/or a machine learning model generated by the central processing unit (e.g., the central processing unit 106) satisfies a defined quality metric (e.g., a defined level of error) with respect to a cost function J for the data matrix 912.

Figure 10:
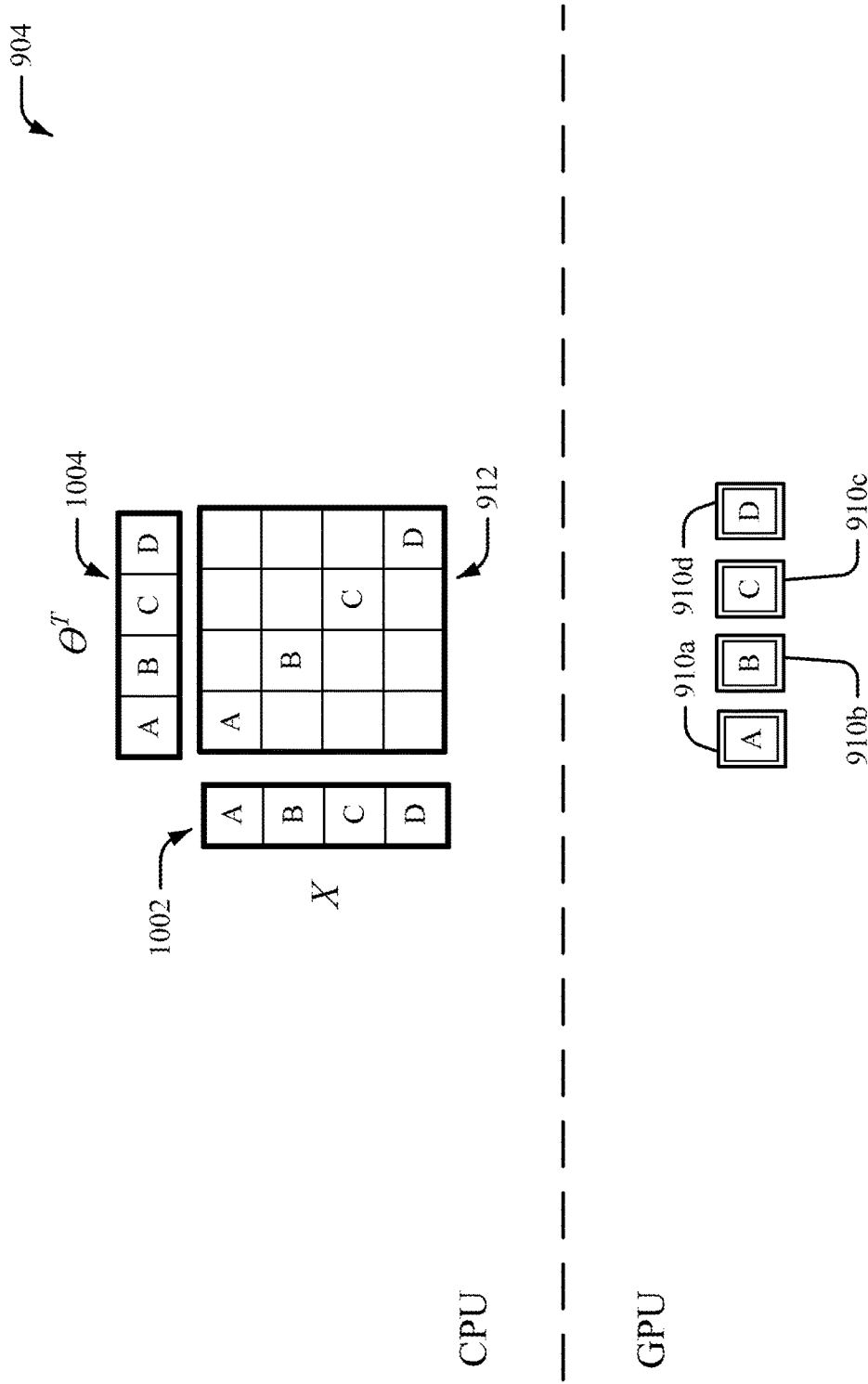
FIG. 10 illustrates an example, non-limiting system associated with a processing stage for matrix factorization in accordance with one or more embodiments described herein.

FIG. 10 illustrates a block diagram of an example, non-limiting embodiment of the second processing stage 904 for matrix factorization in accordance with one or more embodiments described herein. Repetitive description of like elements employed in other embodiments described herein is omitted for sake of brevity.

The second processing stage 904 shown in FIG. 10 can provide further details of the second processing stage 904 shown in FIG. 9. The second processing stage 904 shown in FIG. 10 can include the first graphics processing unit 910a, the second graphics processing unit 910b, the third graphics processing unit 910c, the fourth graphics processing unit 910d, the data matrix 912, a data matrix 1002 and a data matrix 1004. The data matrix 1002 can be, for example, a low rank matrix X. Furthermore, the data matrix 1004 can be, for example, a low rank matrix $\theta^T$. The data matrix 1002 can store data processed by the first graphics processing unit 910a, the second graphics processing unit 910b, the third graphics processing unit 910c, and the fourth graphics processing unit 910d. Furthermore, the data matrix 1004 can also store data processed by the first graphics processing unit 910a, the second graphics processing unit 910b, the third graphics processing unit 910c, and the fourth graphics processing unit 910*d*. A first portion of the data matrix 1002 can include first data associated with the data block A, a second portion of the data matrix 1002 can include second data associated with the data block B, a third portion of the data matrix 1002 can include third data associated with the data block C, and a fourth portion of the data matrix 1002 can include fourth data associated with the data block D. The first data can be generated by the first graphics processing unit 910*a*, the second data can be generated by the second graphics processing unit 910*b*, the third data can be generated by the third graphics processing unit 910*c*, and the fourth data can be generated by the fourth graphics processing unit 910*d*. Additionally, a first portion of the data matrix 1004 can include fifth data associated with the data block A, a second portion of the data matrix 1004 can include sixth data associated with the data block B, a third portion of the data matrix 1004 can include seventh data associated with the data block C, and a fourth portion of the data matrix 1004 can include eighth data associated with the data block D. The fifth data can be generated by the first graphics processing unit 910*a*, the sixth data can be generated by the second graphics processing unit 910*b*, the seventh data can be generated by the third graphics processing unit 910*c*, and the eighth data can be generated by the fourth graphics processing unit 910*d*. As such, the first graphics processing unit 910*a*, the second graphics processing unit 910*b*, the third graphics processing unit 910*c*, and the fourth graphics processing unit 910*d* can update different portions of the data matrix 1002 and the data matrix 1004. Communication between the first graphics processing unit 910*a*, the second graphics processing unit 910*b*, the third graphics processing unit 910*c*, and the fourth graphics processing unit 910*d* can also be avoided to facilitate increased performance and/or increased speed for processing the data matrix 912.

Figure 11:
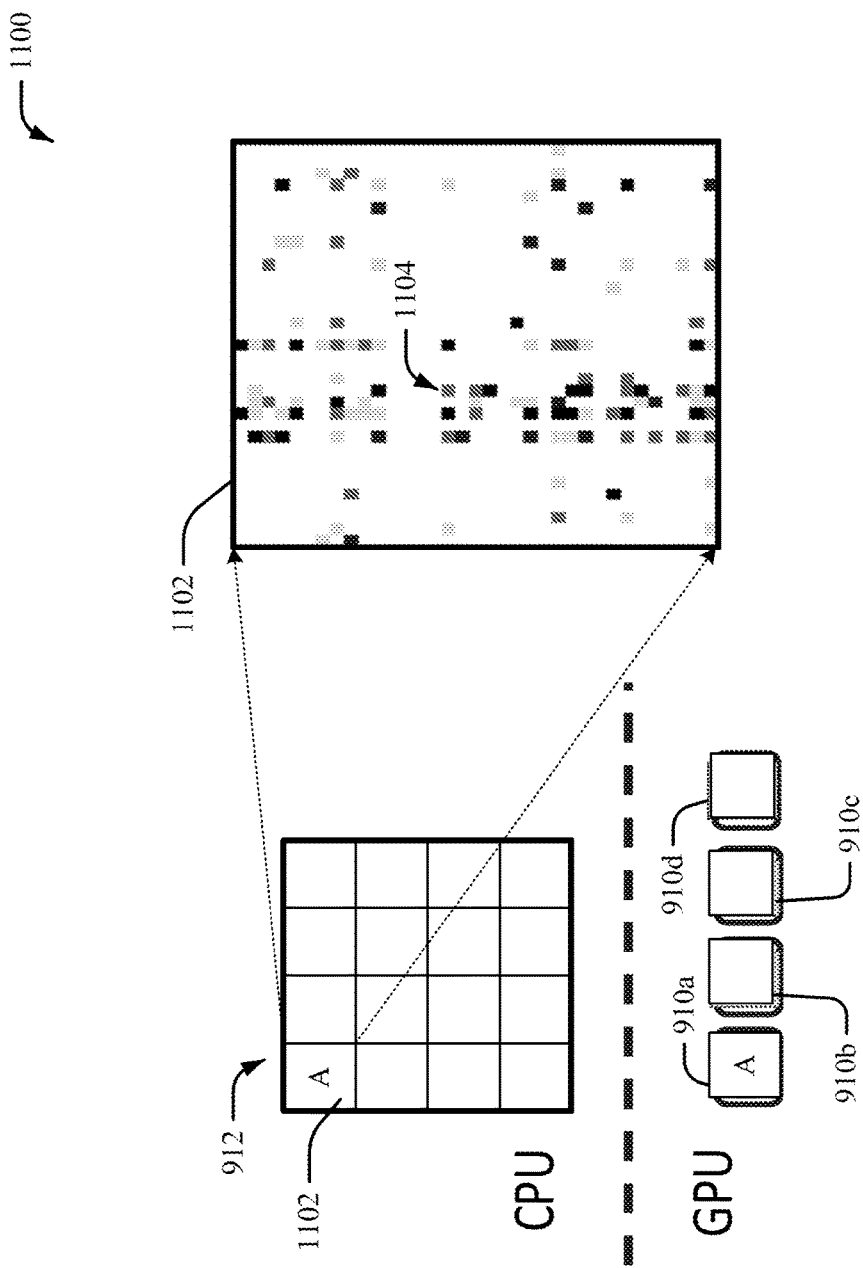
FIG. 11 illustrates an example, non-limiting system associated with a local processing stage for matrix factorization in accordance with one or more embodiments described herein.

FIG. 11 illustrates a block diagram of an example, non-limiting system 1100 associated with a local processing stage for matrix factorization in accordance with one or more embodiments described herein. Repetitive description of like elements employed in other embodiments described herein is omitted for sake of brevity.

The system 1100 can include the first graphics processing unit 910*a*, the second graphics processing unit 910*b*, the third graphics processing unit 910*c*, the fourth graphics processing unit 910*d*, the data matrix 912, and a data block 1102. The data block 1102 can correspond to the data block A of the data matrix 912. In an embodiment, the central processing unit (e.g., the central processing unit 106) can schedule the data block 1102 for processing by a single graphics processing unit (e.g., the first graphics processing unit 910*a*).

The system 1100 can be associated with a local processing stage performed, for example, by the first graphics processing unit 910*a*. For instance, the local processing stage can be associated with processing of the data block A by the first graphics processing unit 910*a*. The data block 1102 can include a set of data elements 1104. In an aspect, an amount of data associated with the set of data elements 1104 in the data block 1102 can be determined based on processing capabilities of the first graphics processing unit 910*a*. For example, an amount of data associated with the set of data elements 1104 in the data block 1102 can be a certain amount to allow the first graphics processing unit 910*a* an adequate amount of time to process the data block 1102 before transmitting information associated with the data block 1102 to the central processing unit (e.g., the central processing unit 106).

The first graphics processing unit 910*a* can process the data block 1102 based on a policy. The central processing unit (e.g., the central processing unit 106) can select the policy from a set of policies. For example, the set of policies can include a first policy for processing the data block 1102 in which the data block 1102 is divided in a set of sub-blocks. A sub-block from the set of sub-blocks can be disjoint with respect to other sub-blocks from the set of sub-blocks. Furthermore, the set of sub-blocks can be processed by a set of processing threads of the first graphics processing unit 910*a*. For example, a first sub-block from the set of sub-blocks can be processed by a first processing thread of the first graphics processing unit 910*a*, a second sub-block from the set of sub-blocks can be processed by a second processing thread of the first graphics processing unit 910*a*, etc. After being processed, a set of updated features associated with the set of sub-blocks can be transmitted to the central processing unit (e.g., the central processing unit 106). Additionally or alternatively, the set of policies can include a second policy for processing the data block 1102 in which data elements of the data block 1102 are randomly selected and updated by a set of processing threads of the first graphics processing unit 910*a*. In one embodiment, a processing thread from the set of processing threads can randomly select, update and/or process the data elements without communicating with another processing thread from the set of processing threads (e.g., without employing a locking synchronization mechanism). In another embodiment, a processing thread from the set of processing threads can randomly select, update and/or process the data elements based on a set of communications with another processing thread from the set of processing threads (e.g., by employing a locking synchronization mechanism). For example, a processing thread from the set of processing threads can provide feedback and/or a processing status to another processing thread from the set of processing threads. In another example, a processing thread from the set of processing threads can wait for another processing thread from the set of processing threads to finish a processing sequence before processing one or more data elements.

Figure 12:
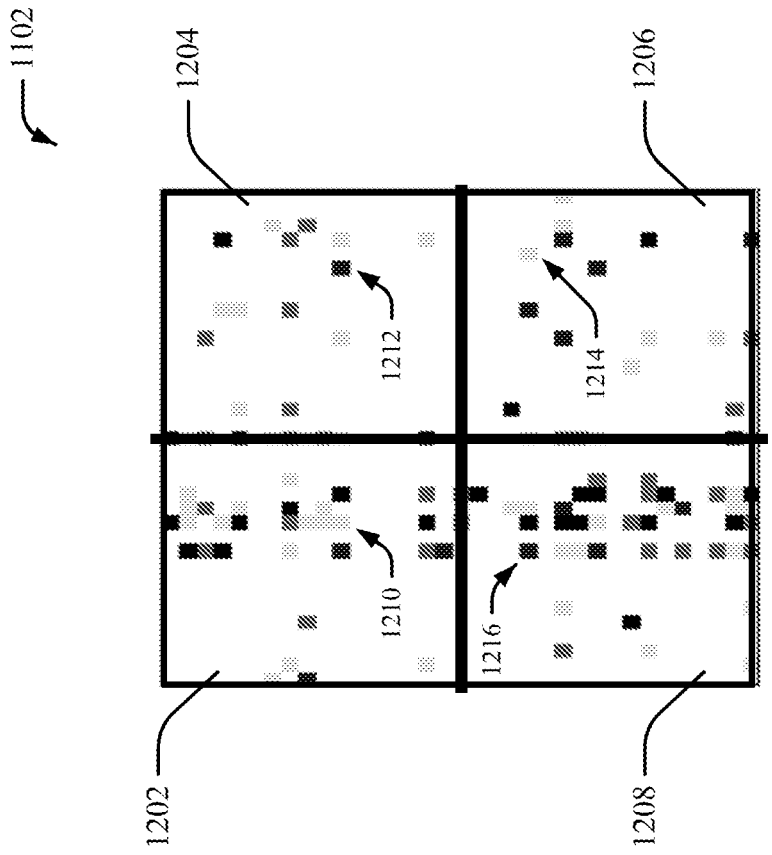
FIG. 12 illustrates an example, non-limiting data block associated with a policy in accordance with one or more embodiments described herein.

FIG. 12 illustrates an example, non-limiting embodiment of the data block 1102 associated with a policy in accordance with one or more embodiments described herein. Repetitive description of like elements employed in other embodiments described herein is omitted for sake of brevity.

In FIG. 12, the data block 1102 can be associated with a first policy for processing the data block 1102 in which the data block 1102 is divided into a set of sub-blocks that can include a first sub-block 1202, a second sub-block 1204, a third sub-block 1206 and a fourth sub-block 1208. The first sub-block 1202 can include a first set of data elements 1210, the second sub-block 1204 can include a second set of data elements 1212, the third sub-block 1206 can include a third set of data elements 1214, and a fourth sub-block 1208 can include a fourth set of data elements 1216. In an aspect, the first sub-block 1202 can be updated and/or processed by a first processing thread of the first graphics processing unit 910*a*, the second sub-block 1204 can be updated and/or processed by a second processing thread of the first graphics processing unit 910*a*, the third sub-block 1206 can be updated and/or processed by a third processing thread of the first graphics processing unit 910*a*, and a fourth sub-block 1208 can be updated and/or processed by a fourth processing thread of the first graphics processing unit 910*a*. The first sub-block 1202 and the third sub-block 1206 can be updated in parallel since the first sub-block 1202 and the third sub-block 1206 are associated with different features. Additionally or alternatively, the second sub-block 1204 and the fourth sub-block 1208 can be updated in parallel since the second sub-block 1204 and the fourth sub-block 1208 are associated with different features.

Figure 13:
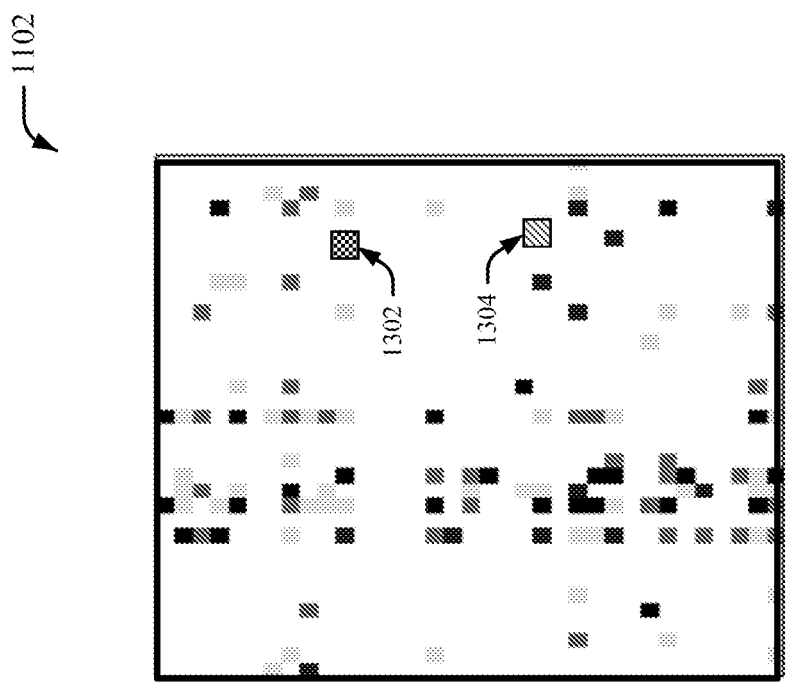
FIG. 13 illustrates another example, non-limiting data block associated with a policy in accordance with one or more embodiments described herein.

FIG. 13 illustrates another example, non-limiting embodiment of the data block 1102 associated with a policy in accordance with one or more embodiments described herein. Repetitive description of like elements employed in other embodiments described herein is omitted for sake of brevity.

In FIG. 13, the data block 1102 can be associated with a second policy for processing the data block 1102 in which data elements of the data block 1102 are randomly selected and updated by a set of processing threads of the first graphics processing unit 910a. For example, a first processing thread from the set of processing threads can randomly select, update and/or process at least a data element 1302 without communicating with a second processing thread from the set of processing threads (e.g., without employing a locking synchronization mechanism between the first processing thread and the second processing thread). Furthermore, the second processing thread from the set of processing threads can randomly select, update and/or process at least a data element 1304 without communicating with the first processing thread from the set of processing threads. It is to be appreciated that the first processing thread and the second processing thread can select, update and/or process more than one data element from the data block 1102. Furthermore, it is to be appreciated that more than two processing threads can select, update and/or process data elements of the data block 1102. In an embodiment, one or more processing thread from the set of processing threads can randomly select, update and/or process the data elements of the data block 1102 based on a set of communications with another processing thread from the set of processing threads (e.g., by employing a locking synchronization mechanism). For instance, the first processing thread from the set of processing threads can randomly select, update and/or process at least the data element 1302 based on a set of communications with the second processing thread from the set of processing threads. In one example, the first processing thread can provide feedback and/or a processing status regarding the data element 1302 to the second processing thread. In another example, the first processing thread can wait for the second processing thread to finish processing the data element 1304 before processing the data element 1302.

Figure 14:
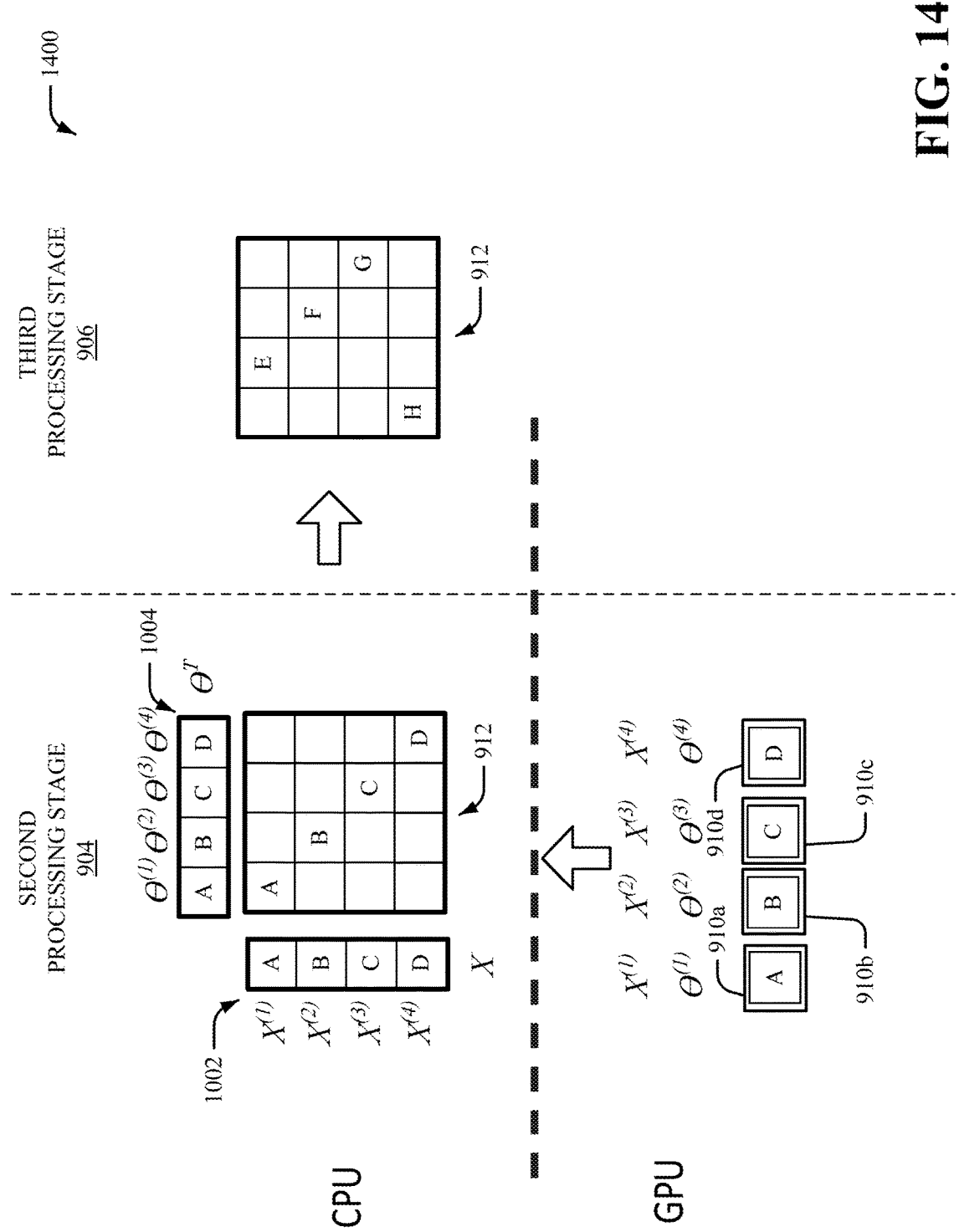
FIG. 14 illustrates an example, non-limiting system associated with a synchronization stage for matrix factorization in accordance with one or more embodiments described herein.

FIG. 14 illustrates a block diagram of an example, non-limiting system 1400 associated with a synchronization stage for matrix factorization in accordance with one or more embodiments described herein. Repetitive description of like elements employed in other embodiments described herein is omitted for sake of brevity.

The system 1400 can illustrate a synchronization stage after local processing stages associated with a set of graphics processing units. For example, the system 1400 can illustrate a synchronization stage between the second processing stage 904 and the third processing stage 906. The system 1400 can include the first graphics processing unit 910a, the second graphics processing unit 910b, the third graphics processing unit 910c, the fourth graphics processing unit 910d, the data matrix 912, the data matrix 1002 and the data matrix 1004.

In an aspect, information associated with the data block A, the data block B, the data block C and/or the data block D can be transmitted to the central processing unit (e.g., the central processing unit 106) after processing of the data block A, the data block B, the data block C and the data block D by the first graphics processing unit 910a, the second graphics processing unit 910b, the third graphics processing unit 910c, the fourth graphics processing unit 910d. For example, the first graphics processing unit 910a can transmit first information associated with the data block A (e.g., $X^{(1)}$ and $\theta^{(1)}$) to the central processing unit (e.g., the central processing unit 106) in response to a determination that processing of the data block A satisfies a defined criterion (e.g., a determination that processing of the data block A is complete). The central processing unit (e.g., the central processing unit 106) can store a portion of the first information (e.g., $X^{(1)}$) in the data matrix 1002 and another portion of the first information (e.g., $\theta^{(1)}$) in the data matrix 1004. Additionally or alternatively, the second graphics processing unit 910b can transmit second information associated with the data block B (e.g., $X^{(2)}$ and $\theta^{(2)}$) to the central processing unit (e.g., the central processing unit 106) in response to a determination that processing of the data block B satisfies a defined criterion (e.g., a determination that processing of the data block B is complete). The central processing unit (e.g., the central processing unit 106) can store a portion of the second information (e.g., $X^{(2)}$) in the data matrix 1002 and another portion of the second information (e.g., $\theta^{(2)}$) in the data matrix 1004. The third graphics processing unit 910c can additionally or alternatively transmit third information associated with the data block C (e.g., $X^{(3)}$ and $\theta^{(3)}$) to the central processing unit (e.g., the central processing unit 106) in response to a determination that processing of the data block C satisfies a defined criterion (e.g., a determination that processing of the data block C is complete). The central processing unit (e.g., the central processing unit 106) can store a portion of the third information (e.g., $X^{(3)}$) in the data matrix 1002 and another portion of the third information (e.g., $\theta^{(3)}$) in the data matrix 1004. Additionally or alternatively, the fourth graphics processing unit 910d can transmit fourth information associated with the data block D (e.g., $X^{(4)}$ and $\theta^{(4)}$) to the central processing unit (e.g., the central processing unit 106) in response to a determination that processing of the data block D satisfies a defined criterion (e.g., a determination that processing of the data block D is complete). The central processing unit (e.g., the central processing unit 106) can store a portion of the fourth information (e.g., $X^{(4)}$) in the data matrix 1002 and another portion of the fourth information (e.g., $\theta^{(4)}$) in the data matrix 1004. As such, the central processing unit (e.g., the central processing unit 106) can synchronize information associated with the data matrix 912 after processing of data blocks is performed by the first graphics processing unit 910a, the second graphics processing unit 910b, the third graphics processing unit 910c, and/or the fourth graphics processing unit 910d.

In an embodiment, the first information, the second information, the third information and/or the fourth information provided by the first graphics processing unit 910a, the second graphics processing unit 910b, the third graphics processing unit 910c, and/or the fourth graphics processing unit 910d can be employed during the third processing stage 906. For example, the first information, the second information, the third information and/or the fourth information provided by the first graphics processing unit 910a, the second graphics processing unit 910b, the third graphics processing unit 910c, and/or the fourth graphics processing unit 910d can be employed while processing one or more other portions of the data matrix 912 (e.g., while processing the data block E, the data block F, the data block F and/or the data block H of the data matrix 912). In a non-limiting example, the first graphics processing unit 910a can copy a portion of the first information (e.g., $X^{(1)}$) into the data matrix 1002 of the central processing unit (e.g., the central processing unit 106) and another portion of the first information (e.g., $\theta^{(1)}$) in the data matrix 1004 of the central processing unit so that the portion of the first information (e.g., $X^{(1)}$) and/or the other portion of the first information (e.g., $\theta^{(1)}$) can be employed while processing the data block E. In another non-limiting example, the central processing unit (e.g., the central processing unit 106) can copy a portion of the first information (e.g., $X^{(1)}$) of the data matrix 1002 and another portion of the second information (e.g., $\theta^{(2)}$) of the data matrix 1004 to the first graphics processing unit 910a so that the portion of the first information (e.g., $X^{(1)}$) and the other portion of the second information (e.g., $\theta^{(2)}$) can be employed while processing the data block E. In another non-limiting example, the central processing unit (e.g., the central processing unit 106) can copy a portion of the fourth information (e.g., $X^{(4)}$) of the data matrix 1002 and another portion of the first information (e.g., $\theta^{(1)}$) of the data matrix 1004 to the fourth graphics processing unit 910d so that the portion of the fourth information (e.g., $X^{(4)}$) and the other portion of the first information (e.g., $\theta^{(1)}$) can be employed while processing the data block H.

In another embodiment, the first graphics processing unit 910a can withhold from transmitting the first information associated with the data block A to the central processing unit (e.g., the central processing unit 106), the second graphics processing unit 910b can withhold from transmitting the second information associated with the data block B to the central processing unit, the third graphics processing unit 910c can withhold from transmitting the third information associated with the data block C to the central processing unit, and/or the fourth graphics processing unit 910d can withhold from transmitting the fourth information associated with the data block D to the central processing unit in response to a determination that the third processing stage 906 satisfies a defined criterion. For example, the first graphics processing unit 910a can withhold from transmitting the first information associated with the data block A to the central processing unit (e.g., the central processing unit 106) in response to a determination that the first graphics processing unit 910a can employ the first information while processing the data block E during the third processing stage 906.

Figure 15:
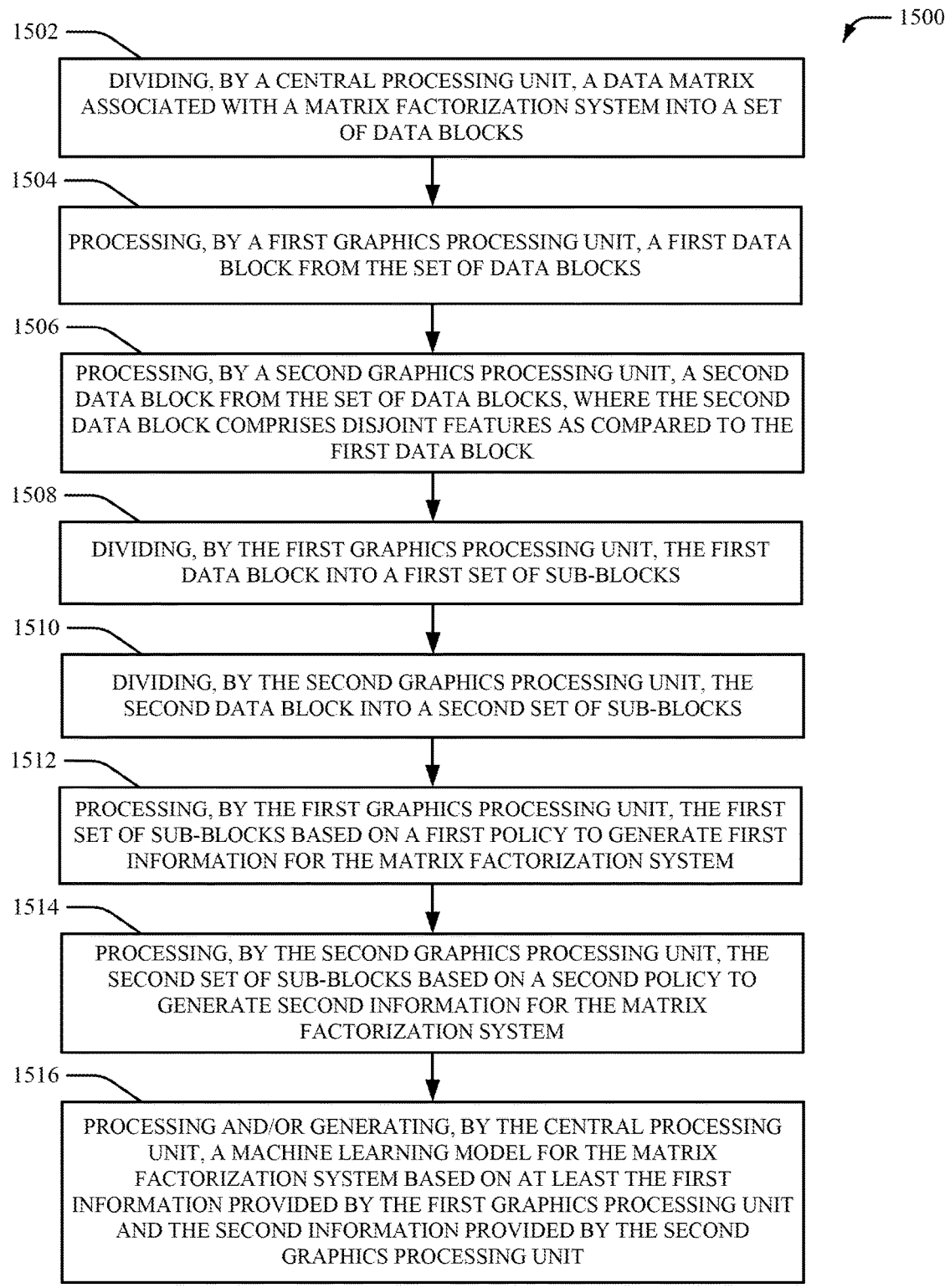
FIG. 15 illustrates a flow diagram of an example, non-limiting computer-implemented method for performing a matrix factorization process in accordance with one or more embodiments described herein.

FIG. 15 illustrates a flow diagram of an example, non-limiting computer-implemented method 1500 for performing a matrix factorization process in accordance with one or more embodiments described herein. At 1502, a data matrix associated with a matrix factorization system is divided into a set of data blocks by a central processing unit (e.g., by central processing unit 106). At 1504, a first data block from the set of data blocks is processed by a first graphics processing unit (e.g., by first graphics processing unit 102). At 1506, a second data block from the set of data blocks is processed by a second graphics processing unit (e.g., by second graphics processing unit 104), in which the second data block comprises disjoint features as compared to the first data block. At 1508, the first data block is divided into a first set of sub-blocks by the first graphics processing unit (e.g., by first graphics processing unit 102). At 1510, the second data block is divided into a second set of sub-blocks by the second graphics processing unit (e.g., by second graphics processing unit 104). At 1512, the first set of sub-blocks is processed by the first graphics processing unit (e.g., by first graphics processing unit 102) based on a first policy to generate first information for the matrix factorization system. At 1514, the second set of sub-blocks is processed by the second graphics processing unit (e.g., by second graphics processing unit 104) based on a second policy to generate second information for the matrix factorization system. At 1516, a machine learning model for the matrix factorization system is processed and/or generated by the central processing unit (e.g., by central processing unit 106) based on at least the first information provided by the first graphics processing unit and the second information provided by the second graphics processing unit.

Figure 16:
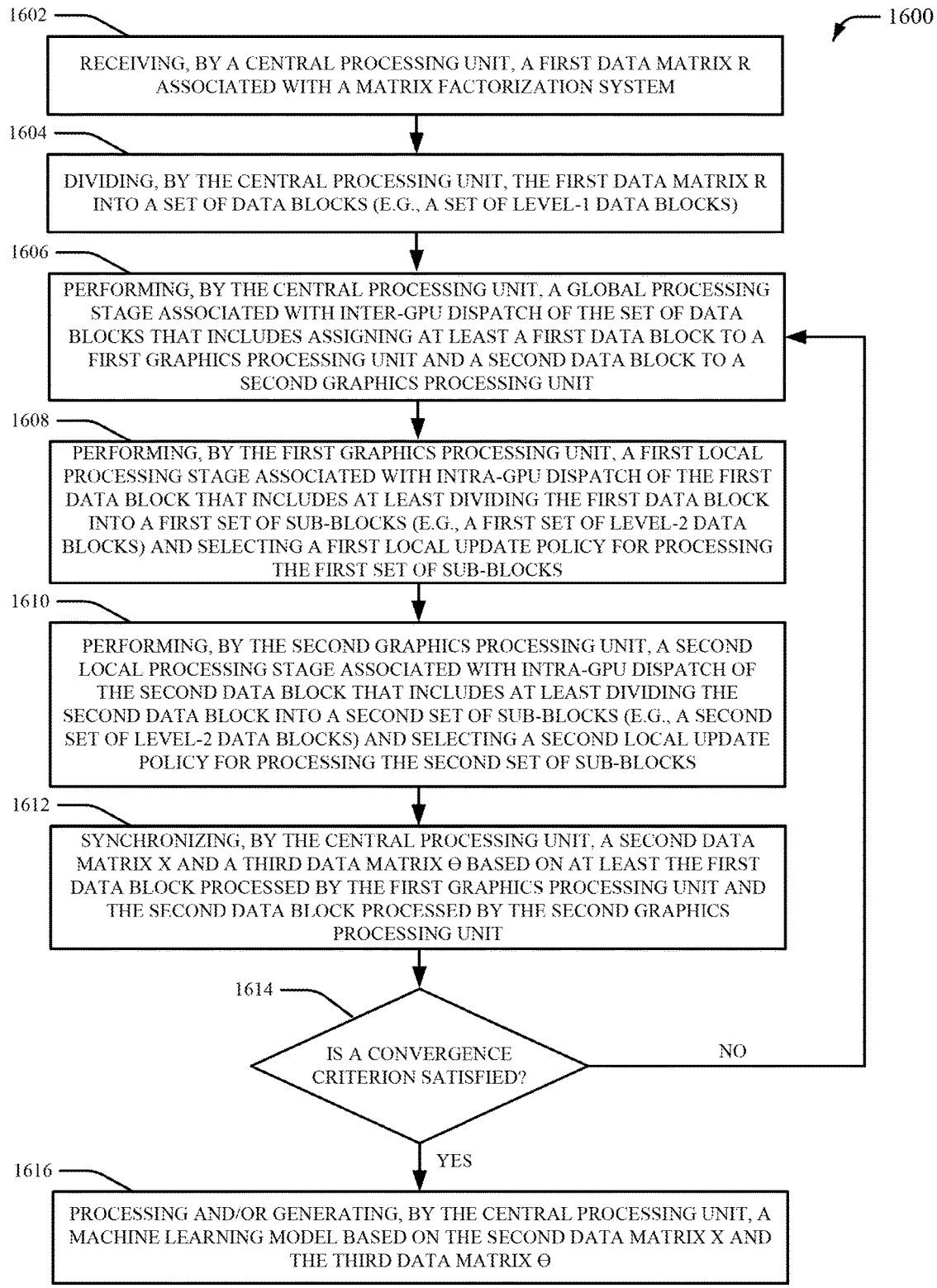
FIG. 16 illustrates a flow diagram of another example, non-limiting computer-implemented method for performing a matrix factorization process in accordance with one or more embodiments described herein.

FIG. 16 illustrates a flow diagram of another example, non-limiting computer-implemented method 1600 for performing a matrix factorization process in accordance with one or more embodiments described herein. At 1602, a first data matrix R associated with a matrix factorization system is received by a central processing unit (e.g., by central processing unit 106). At 1604, the first data matrix R is divided into a set of data blocks (e.g., a set of Level-1 data blocks) by the central processing unit (e.g., by central processing unit 106). At 1606, a global processing stage associated with inter-GPU dispatch of the set of data blocks is performed by the central processing unit (e.g., by central processing unit 106), in which the global processing stage includes assigning at least a first data block to a first graphics processing unit and a second data block to a second graphics processing unit. At 1608, a first local processing stage associated with intra-GPU dispatch of the first data block is performed by the first graphics processing unit (e.g., by first graphics processing unit 102), in which the first local processing stage includes at least dividing the first data block into a first set of sub-blocks (e.g., a first set of Level-2 data blocks) and selecting a first local update policy for processing the first set of sub-blocks. At 1610, a second local processing stage associated with intra-GPU dispatch of the second data block is performed by the second graphics processing unit (e.g., by second graphics processing unit 104), in which the second local processing stage includes at least dividing the second data block into a second set of sub-blocks (e.g., a second set of Level-2 data blocks) and selecting a second local update policy for processing the second set of sub-blocks. At 1612, a second data matrix X and a third data matrix $\theta$ are synchronized by the central processing unit (e.g., central processing unit 106) based on at least the first data block processed by the first graphics processing unit and the second data block processed by the second graphics processing unit. At 1614, it is determined whether a convergence criterion is satisfied. For example, it can be determined whether a quality metric associated with the second data matrix X and the third data matrix $\theta$ satisfies a defined criterion. If no, the method 1600 can return to 1606. If yes, the method 1600 can proceed to 1616. At 1616, a machine learning model is processed and/or generated by the central processing unit (e.g., central processing unit 106) based on the second data matrix X and the third data matrix $\theta$.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least performing a matrix factorization process and generation of a machine learning model are established from a combination of electrical and mechanical components and circuitry, a human is unable to replicate or perform processing performed by a central processing unit (e.g., the central processing unit 106) and/or graphic processing unit(s) (e.g., the first graphics processing unit 102, the second graphics processing unit 104, the first graphics processing unit 910a, the second graphics processing unit 910b, the third graphics processing unit 910c, and/or the fourth graphics processing unit 910d) disclosed herein. For example, a human is unable to communicate data and/or packetized data associated with a matrix factorization process and/or a machine learning model between a central processing unit e.g., the central processing unit 106) and/or graphic processing unit(s) (e.g., the first graphics processing unit 102, the second graphics processing unit 104, the first graphics processing unit 910a, the second graphics processing unit 910b, the third graphics processing unit 910c, and/or the fourth graphics processing unit 910d).

Figure 17:
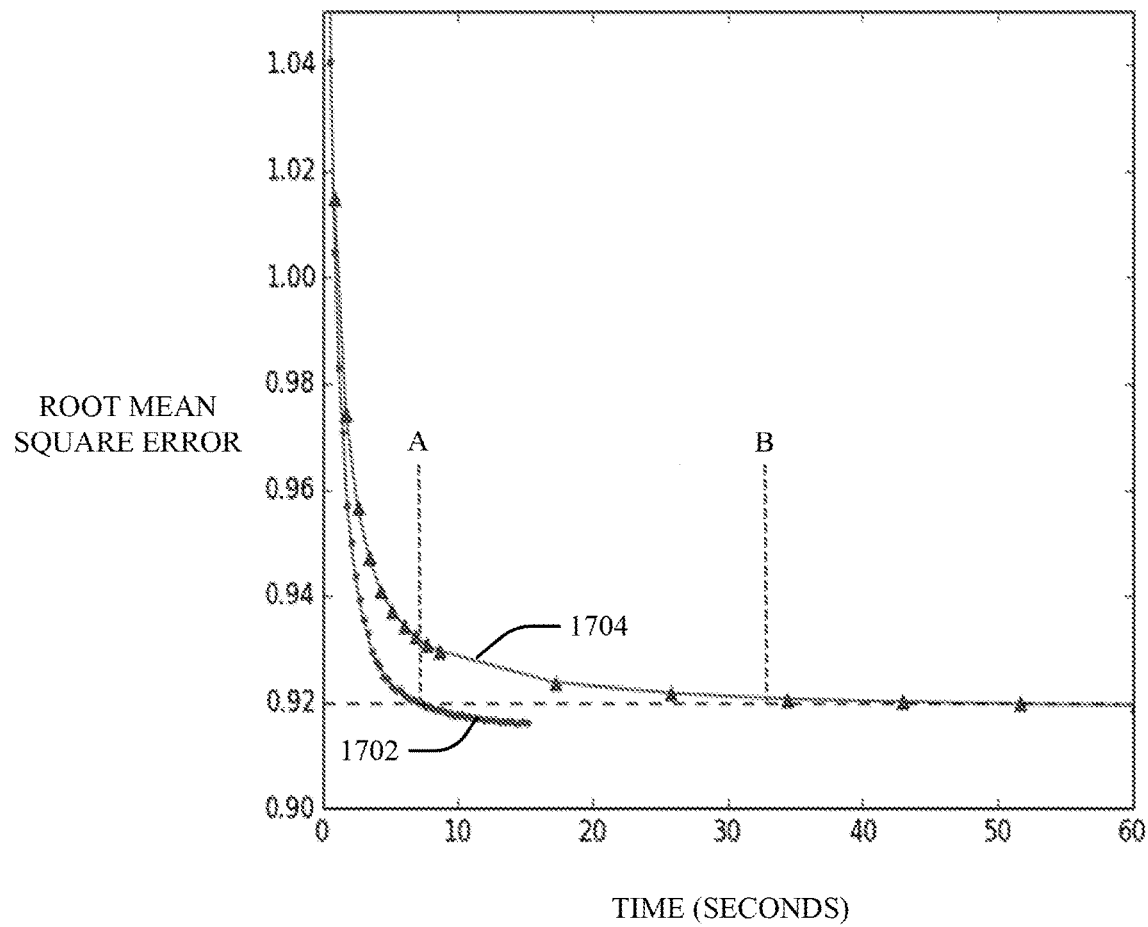
FIG. 17 illustrates a graph of processing time and error for an example, non-limiting matrix factorization process in accordance with one or more embodiments described herein.

FIG. 17 illustrates a graph 1700 of processing time and error for an example, non-limiting matrix factorization process in accordance with one or more embodiments described herein. An x-axis of the graph 1700 depicts an amount of time in seconds. A y-axis of the graph 1700 depicts root mean square error (RMSE). As shown in FIG. 17, a novel matrix factorization process 1702 associated with novel systems and methods disclosed herein (e.g., the system 100, the system 200, the system 300, the system 900, the method 1500 and/or the method 1600) can be performed in a shorter amount of time than a conventional matrix factorization process 1704 associated with a conventional system. For example, the novel matrix factorization process 1702 can be completed and/or can achieve a particular degree of error (e.g., an RMSE value equal to 0.92) at a time A equal to approximately 8 seconds. In contrast, the conventional matrix factorization process 1704 can be completed and/or can achieve the particular degree of error (e.g., the RMSE value equal to 0.92) at a time B equal to approximately 35 seconds. As such the novel matrix factorization process 1702 can be, for example, approximately 4 times faster than the conventional matrix factorization process 1704. The novel matrix factorization process 1702 can be, for example, a matrix factorization process associated with a ratings system for rating movies.

Figure 18:
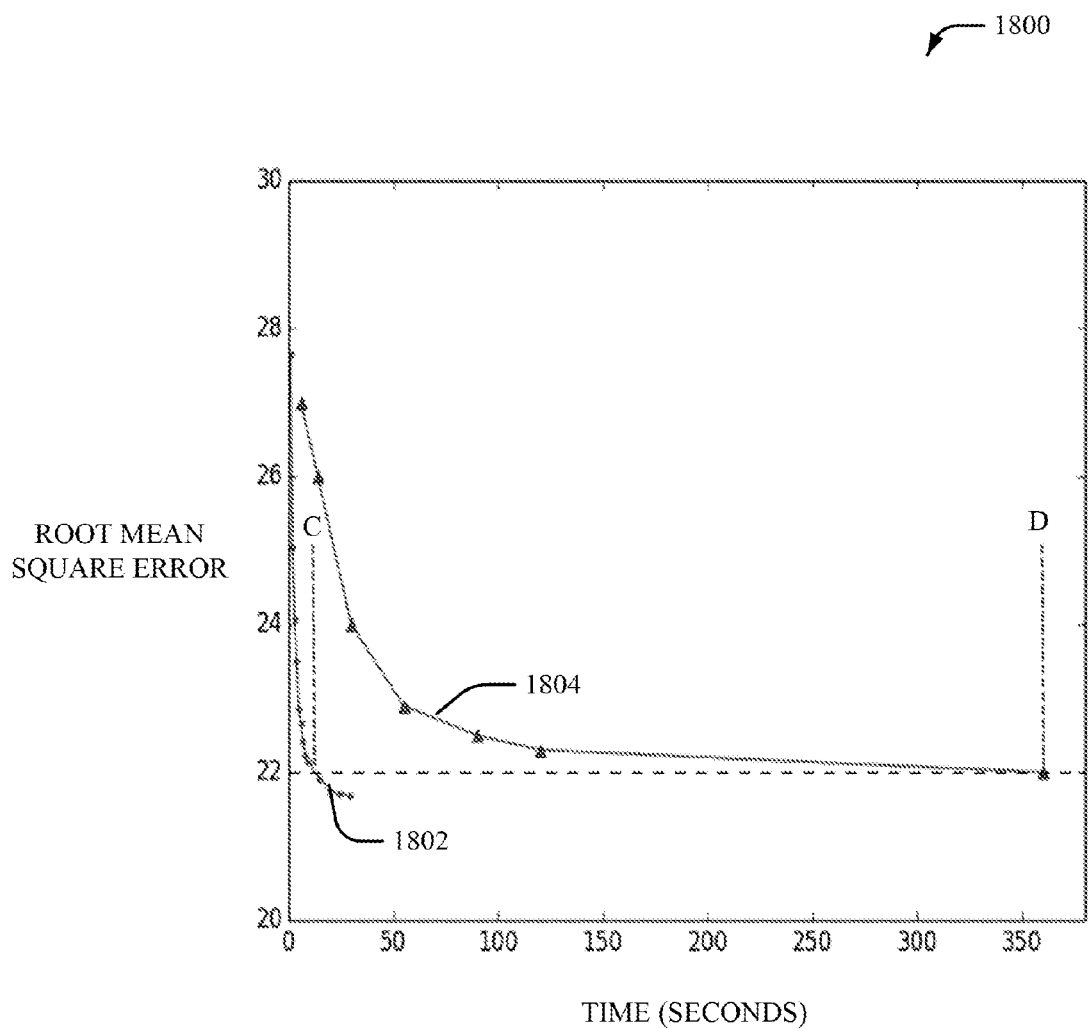
FIG. 18 illustrates a graph of processing time and error for another example, non-limiting matrix factorization process in accordance with one or more embodiments described herein.

FIG. 18 illustrates a graph 1800 of processing time and error for another example, non-limiting matrix factorization process in accordance with one or more embodiments described herein. An x-axis of the graph 1800 depicts an amount of time in seconds. A y-axis of the graph 1800 depicts RMSE. As shown in FIG. 18, a novel matrix factorization process 1802 associated with novel systems and methods disclosed herein (e.g., the system 100, the system 200, the system 300, the system 900, the method 1500 and/or the method 1600) can be performed in a shorter amount of time than a conventional matrix factorization process 1804 associated with a conventional system. For example, the novel matrix factorization process 1802 can be completed and/or can achieve a particular degree of error (e.g., an RMSE value equal to 22) at a time C equal to approximately 15 seconds. In contrast, the conventional matrix factorization process 1804 can be completed and/or can achieve the particular degree of error (e.g., the RMSE value equal to 22) at a time D equal to approximately 360 seconds. As such the novel matrix factorization process 1802 can be, for example, approximately 20 times faster than the conventional matrix factorization process 1804. The novel matrix factorization process 1802 can be, for example, a matrix factorization process associated with a ratings system for rating songs.

Figure 19:
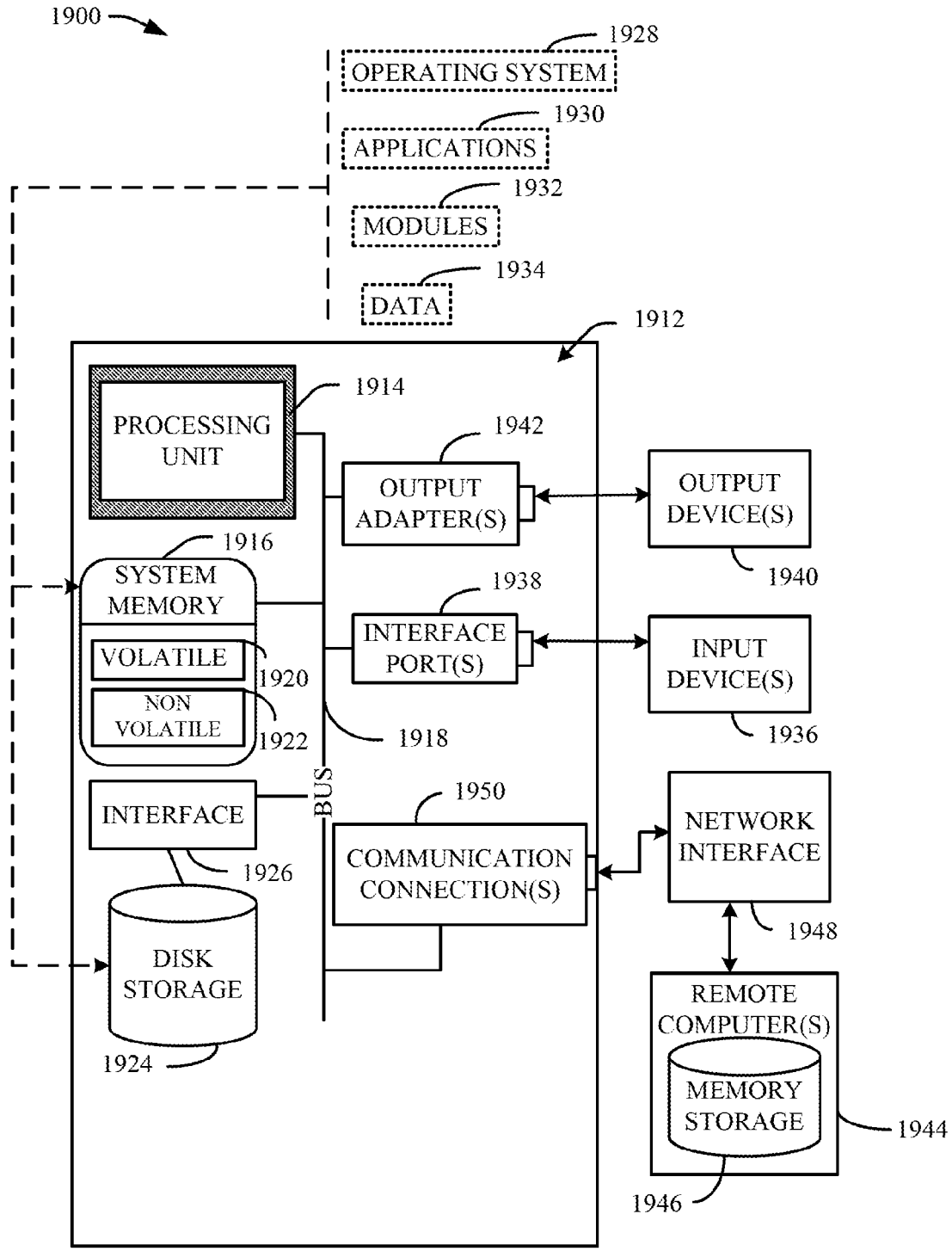
FIG. 19 illustrates a block diagram of an example, non-limiting operating environment in which one or more embodiments described herein can be facilitated.

In order to provide a context for the various aspects of the disclosed subject matter, FIG. 19 as well as the following discussion are intended to provide a general description of a suitable environment in which the various aspects of the disclosed subject matter can be implemented. FIG. 19 illustrates a block diagram of an example, non-limiting operating environment in which one or more embodiments described herein can be facilitated. Repetitive description of like elements employed in other embodiments described herein is omitted for sake of brevity.

With reference to FIG. 19, a suitable operating environment 1900 for implementing various aspects of this disclosure can also include a computer 1912. The computer 1912 can also include a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914. The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1916 can also include volatile memory 1920 and nonvolatile memory 1922. The basic input/output system (BIOS), containing the basic routines to transfer information between elements within the computer 1912, such as during start-up, is stored in nonvolatile memory 1922. Computer 1912 can also include removable/non-removable, volatile/non-volatile computer storage media. FIG. 19 illustrates, for example, a disk storage 1924. Disk storage 1924 can also include, but is not limited to, devices like a magnetic disk drive, floppy disk drive, tape drive, Jaz drive, Zip drive, LS-100 drive, flash memory card, or memory stick. The disk storage 1924 also can include storage media separately or in combination with other storage media. To facilitate connection of the disk storage 1924 to the system bus 1918, a removable or non-removable interface is typically used, such as interface 1926. FIG. 19 also depicts software that acts as an intermediary between users and the basic computer resources described in the suitable operating environment 1900. Such software can also include, for example, an operating system 1928. Operating system 1928, which can be stored on disk storage 1924, acts to control and allocate resources of the computer 1912.

System applications 1930 take advantage of the management of resources by operating system 1928 through program modules 1932 and program data 1934, e.g., stored either in system memory 1916 or on disk storage 1924. It is to be appreciated that this disclosure can be implemented with various operating systems or combinations of operating systems. A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port can be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a computer, a server, a router, a network PC, a workstation, a microprocessor based appliance, a peer device or other common network node and the like, and typically can also include many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1950 refers to the hardware/software employed to connect the network interface 1948 to the system bus 1918. While communication connection 1950 is shown for illustrative clarity inside computer 1912, it can also be external to computer 1912. The hardware/software for connection to the network interface 1948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a first graphics processing unit that processes a first data block of a data matrix associated with a matrix factorization system to generate first information for the matrix factorization system;
    a second graphics processing unit that processes a first portion of a second data block of the data matrix separate from a second portion of the second data block to generate second information for the matrix factorization system, wherein the second data block comprises disjoint, unrelated features compared to the first data block, and wherein the first data block and the second data block comprise a corresponding size; and
    a central processing unit that processes a machine learning model for the matrix factorization system based on at least the first information provided by the first graphics processing unit and the second information provided by the second graphics processing unit.

2. The system of claim 1, wherein the second graphics processing unit divides the second data block into at least the first portion of the second data block and the second portion of the second data block.

3. The system of claim 1, wherein the second graphics processing unit processes the first portion of the second data block based on a set of policies for processing the second data block.

4. The system of claim 1, wherein the second graphics processing unit processes the first portion of the second data block based on an amount of data included in the second data block.

5. The system of claim 1, wherein the second graphics processing unit processes the first portion of the second data block based on performance of an atomic operation associated with the second graphics processing unit.

6. The system of claim 1, wherein the first graphics processing unit transmits the first information to the central processing unit in response to a determination that a criterion associated with the first data block is satisfied.

7. The system of claim 1, wherein the second graphics processing unit transmits the second information to the central processing unit in response to a determination that a criterion associated with the second data block is satisfied.

8. The system of claim 1, wherein the machine learning model is associated with a stochastic gradient descent process, and wherein the first information provided by the first graphics processing unit and the second information provided by the second graphics processing unit facilitate improved processing performance for the central processing unit during the stochastic gradient descent process.

9. The system of claim 1, wherein the machine learning model is further processed by an integrated circuit based on at least the first information provided by the first graphics processing unit and the second information provided by the second graphics processing unit.

10. The system of claim 1, wherein the system further comprises:
    a third graphics processing unit that processes a third data block of the data matrix to generate third information for the matrix factorization system; and
    a fourth graphics processing unit that processes a third portion of a fourth data block of the data matrix based on a fourth portion of the fourth data block to generate fourth information for the matrix factorization system.

11. The system of claim 10, wherein the central processing unit is a first central processing unit, and wherein the system further comprises:
a second central processing unit that processes a portion of the machine learning model for the matrix factorization system based on at least the third information provided by the third graphics processing unit and the fourth information provided by the fourth graphics processing unit.

12. A computer-implemented method, comprising:
processing, by a first graphics processing unit, a first data block from a set of data blocks based on a first policy to generate first information for a matrix factorization system;
dividing, by a second graphics processing unit, a second data block from the set of data blocks into a set of sub-blocks, wherein the second data block comprises disjoint, unrelated features as compared to the first data block;
processing, by the second graphics processing unit, the set of sub-blocks based on a second policy to generate second information for the matrix factorization system; and
generating, by the central processing unit, a machine learning model for the matrix factorization system based on at least the first information provided by the first graphics processing unit and the second information provided by the second graphics processing unit.

13. The computer-implemented method of claim 12, further comprising:
dividing, by the central processing unit, a data matrix associated with the matrix factorization system into the set of data blocks.

14. The computer-implemented method of claim 12, wherein the set of sub-blocks comprises a first set of sub-blocks, and the computer-implemented method further comprises:
dividing, by the first graphics processing unit, the first data block into a second set of sub-blocks.

15. The computer-implemented method of claim 14, further comprising:
processing, by the first graphics processing unit, the second set of sub-blocks based on the first policy.

16. The computer-implemented method of claim 12, further comprising:
synchronizing, by the central processing unit, a first data matrix and a second data matrix based on the first information provided by the first graphics processing unit and the second information provided by the second graphics processing unit.

17. The computer-implemented method of claim 12, wherein the generating the machine learning model for the matrix factorization system comprises reducing an amount of time for performing a matrix factorization process associated with the matrix factorization system.

18. A computer program product for matrix factorization, the computer program product comprising a computer readable storage medium having program instructions embodied therewith, the program instructions executable by a central processing unit to cause the central processing unit to:
divide a data matrix associated with a matrix factorization system into a set of data blocks;
assign a first data block from the set of data blocks to a first graphics processing unit;
assign a second data block from the set of data blocks to a second graphics processing unit, wherein the second data block comprises unrelated, mutually exclusive features as compared to the first data block; and
generate a machine learning model for the matrix factorization system based on at least first information associated with the first data block that is determined by the first graphics processing unit, and the second information associated with the second data block that is determined by the second graphics processing unit.

19. The computer program product of claim 18, wherein the program instructions are further executable by the central processing unit to cause the central processing unit to:
store a portion of the first information in a first data matrix and another portion of the first information in a second data matrix.

20. The computer program product of claim 19, wherein the program instructions are further executable by the central processing unit to cause the central processing unit to:
generate the machine learning model for the matrix factorization system based on the first data matrix and the second data matrix.

* * * * *